(12) United States Patent
Axelsson

(10) Patent No.: US 11,964,890 B2
(45) Date of Patent: Apr. 23, 2024

(54) METHODS AND VENTILATION SYSTEM FOR CONTROLLING A BIOLOGICAL TREATMENT PROCESS

(71) Applicant: BIOTERIA TECHNOLOGIES AB, Täby (SE)

(72) Inventor: Niklas Axelsson, Täby (SE)

(73) Assignee: Bioteria Technologies AB, Täby (SE)

( * ) Notice: Subject to any disclaimer, the term of this patent is extended or adjusted under 35 U.S.C. 154(b) by 240 days.

(21) Appl. No.: 17/622,180

(22) PCT Filed: Jun. 26, 2020

(86) PCT No.: PCT/SE2020/050673
§ 371 (c)(1),
(2) Date: Dec. 22, 2021

(87) PCT Pub. No.: WO2020/263172
PCT Pub. Date: Dec. 30, 2020

(65) Prior Publication Data
US 2022/0340460 A1    Oct. 27, 2022

(30) Foreign Application Priority Data
Jun. 26, 2019   (SE) .................... 1950789-6

(51) Int. Cl.
*C02F 3/00*      (2023.01)
*C02F 3/06*      (2023.01)
*C02F 3/34*      (2023.01)

(52) U.S. Cl.
CPC ............... *C02F 3/006* (2013.01); *C02F 3/06* (2013.01); *C02F 3/343* (2013.01); *C02F 3/348* (2013.01); *C02F 2209/00* (2013.01)

(58) Field of Classification Search
CPC .. C02F 3/006; C02F 3/06; C02F 3/343; C02F 3/348; C02F 2209/00; C02F 3/02;
(Continued)

(56) References Cited

U.S. PATENT DOCUMENTS 5,235,963 A *  8/1993  Strause ................. B08B 9/0433
                                                134/167 C
7,288,187 B1 * 10/2007  Bovaird ................. C02F 3/006
                                                210/150
(Continued)

FOREIGN PATENT DOCUMENTS

CA      3144584 A1 * 12/2020  .............. C02F 3/006
CA      3144589 A1 * 12/2020  .............. C02F 3/006
(Continued)

OTHER PUBLICATIONS

Extended European Search Report issued in European patent application No. 20831907.9, dated Jun. 22, 2023.
(Continued)

*Primary Examiner* — Daniel Pihulic
(74) *Attorney, Agent, or Firm* — Faegre Drinker Biddle & Reath LLP

(57) ABSTRACT

A method and a ventilation system includes ventilation ducts, a control system and at least one spray nozzle. The at least one spray nozzle is configured to spray a liquid mist onto at least one portion of an inner surface of the ventilation system. The liquid mist contains a culture of microorganisms adapted for biologically treating fat, oil and grease present on at least one portion of the inner surface of the ventilation system, thereby providing for partial biodegradation of the fat, oil and grease present on the at least one portion of the inner surfaces of the ventilation system.

22 Claims, 4 Drawing Sheets

(58) Field of Classification Search
CPC ........... C02F 3/00; B08B 9/027; Y02A 50/20; Y02W 10/10; Y02W 10/37; F24C 15/2057; C12M 1/36
See application file for complete search history.

(56) References Cited

U.S. PATENT DOCUMENTS

| | | | | |
|---|---|---|---|---|
| 8,746,231 | B2* | 6/2014 | Kellogg | ............ F24C 15/2057 454/55 |
| 2003/0190742 | A1 | 10/2003 | Whiteman | |
| 2010/0193430 | A1 | 8/2010 | Whiteman | |
| 2012/0125840 | A1 | 5/2012 | Smith | |
| 2012/0132586 | A1 | 5/2012 | Smith | |
| 2018/0304316 | A1* | 10/2018 | Khandjian | ............ B08B 9/0325 |
| 2019/0368747 | A1* | 12/2019 | Rousseau | .................. B08B 9/00 |
| 2022/0315464 | A1* | 10/2022 | Axelsson | ................ F24C 15/2057 |
| 2022/0340460 | A1* | 10/2022 | Axelsson | ................ B08B 9/027 |

FOREIGN PATENT DOCUMENTS

| | | | | |
|---|---|---|---|---|
| DE | 102004036837 | A1 | 3/2006 | |
| EP | 1775035 | A1 | 4/2007 | |
| EP | 3990834 | A1 * | 5/2022 | ............ C02F 3/006 |
| ES | 2237422 | T3 | 8/2005 | |
| FR | 2851941 | A1 | 9/2004 | |
| JP | H07308691 | A | 11/1995 | |
| JP | H07308692 | A | 11/1995 | |
| JP | 10-296294 | A | 11/1998 | |
| JP | 2001-060101 | A | 3/2001 | |
| PT | 2333446 | T | 9/2017 | |
| WO | 2008/157418 | A1 | 12/2008 | |
| WO | 2009/108996 | A1 | 9/2009 | |
| WO | WO-2014/000868 | A1 | 1/2014 | |
| WO | WO-2014000868 | A1 * | 1/2014 | ............ B01D 47/06 |
| WO | WO-2017/005659 | A1 | 1/2017 | |
| WO | WO-2018/129619 | A1 | 7/2018 | |
| WO | WO-2018129619 | A1 * | 7/2018 | ............ B08B 15/02 |
| WO | 2018/156149 | A1 | 8/2018 | |
| WO | WO-2019/098255 | A1 | 5/2019 | |
| WO | WO-2020263172 | A1 * | 12/2020 | ............ C02F 3/006 |
| WO | WO-2020263173 | A1 * | 12/2020 | ............ C02F 3/006 |

OTHER PUBLICATIONS

International Preliminary Report on Patentability received for PCT Patent Application No. PCT/SE2020/050674, dated Sep. 30, 2021, 13 pages.
International Search Report and Written Opinion received for PCT Patent Application No. PCT/SE2020/050674, dated Jul. 16, 2020, 18 pages.
Mudie, S. et al., "Fat, oil and grease reduction in commercial kitchen ductwork: A novel biological approach," Waste Management, 2017, vol. 61, pp. 28-39.
Office Action from Swedish patent application No. 1950789-6, dated Jul. 16, 2020.

* cited by examiner

METHODS AND VENTILATION SYSTEM FOR CONTROLLING A BIOLOGICAL TREATMENT PROCESS

CROSS-REFERENCE TO PRIOR APPLICATIONS

This application is a § 371 National Stage Application of PCT International Application No. PCT/SE2020/050673 filed Jun. 26, 2020, which claims priority to Swedish Patent Application No. 1950789-6 filed on Jun. 26, 2019, both of which are incorporated herein in their entirety.

TECHNICAL FIELD

The technology disclosed relates to methods, and a control system for controlling a process using microorganisms for the biological treatment of accumulated fat, oil and grease (FOG) in a ventilation system for purifying air.

The technology disclosed relates to a method, a ventilation system and an apparatus for controlling a biological treatment process in a ventilation system for purifying air.

The technology disclosed further relates to methods, systems comprising at least one of sensor data, captured image data, process variables, IoT (Internet of Things) and artificial intelligence for changing a biological treatment process.

The technology disclosed involves adding a beneficial composition of microorganism and/or changing at least one process variable of at least one process for the biological treatment of accumulated fat, oil and grease in a ventilation system, e.g. a process for purifying air in a ventilation system.

In particular, the technology disclosed relates to methods, systems comprising at least one of sensor data, image data, process variables, IoT (Internet of Things) and artificial intelligence for changing a treatment process which involves spraying a liquid mist containing a composition/culture of microorganism to a biological treatment process and/or changing at least one process variable of at least one process for the biological treatment of accumulated fat, oil and grease, where the ventilation system may be adapted for purifying air streams in the ducts or tubes of the ventilation system.

BACKGROUND

Various methods of removing bacteria viruses and other contaminants exist for use as stand-alone system or as a module installed in a new or existing ventilation system. Various types of filters remove contaminants above certain size by physically separating particles over a certain size, which may include dust particles, bacteria and viruses. Other systems use energy in the form of light or radiation to kill undesirable bacterial and viral micro-organisms. Still other filtration systems use activated charcoal or a similar material to adsorb unwanted odors, airborne particles, cigarette smoke, and pollutants from the air in an enclosed space. The threat of airborne hazards has created a need for an efficient air purifying system.

It is therefore an object of the invention to provide a ventilation system for efficiently removing fat, oil and grease accumulated on the inner surfaces of the ventilation systems and for controlling the treatment of accumulated fat, oil and grease to in a cost-effective, environment-friendly and energy-efficient manner.

Problems with the Prior Art

The above-mentioned methods for removing bacteria viruses and other contaminants for use as stand-alone system or as a module installed in a new or existing ventilation system do not provide fast response and is optimizing the addition of The various types of filters mentioned-above for removing contaminants above certain size by physically separating particles over a certain size, do not suggest the addition of microorganisms for biologically treating fat, oil and grease accumulated on the inner surfaces of the ventilation ducts or tubes.'.

Moreover, today there exists no efficient solution for the biological treatment of fat, oil and grease (FOG) accumulated in an air purifying system such as a ventilation system where the biological process for breaking down FOG in the air purifying system is optimized and improved in being controlled by a control system and based on obtained sensor data.

It is therefore an object of the invention to provide a ventilation system comprising a control system for improving and optimizing the biological treatment of accumulated FOG on the inner surfaces of a ventilation system, and which is cost-effective and energy-efficient manner.

A further object of the invention is to avoid accumulation of too much media comprising microorganisms from the biological treatment process on the inner surfaces of the ventilation system, which may have an adverse effect on the efficiency of the process for purifying air.

SUMMARY

The technology disclosed relates to methods and a system for detecting any change in the bioprocess, e.g. to the better or worse, in terms of biodegradation of fat, oil and/or grease (FOG).

The technology disclosed relates to a ventilation system comprising ducts or tubes with an inner surface area for biologically treating fat, oil and/or grease by spraying a liquid mist containing a culture of microorganisms for partial biodegradation of the fat, oil and/or grease and/or breaking down the fat, oil and/or grease, where the system comprises a control system or unit and at least one sensor, camera and/or microphone for obtaining sensor data related to the biological treatment process, and where the control system or unit may be configured to change the frequency and/or time instants for activating the at least one spray nozzle and/or the amount of liquid mist or microorganisms per unit of time sprayed onto the at least one portion of the inner surface based on at least one of obtained sensor data, image data and/or audio data and an estimated amount of accumulated fat, oil and grease.

According to the technology disclosed, the frequency and/or time instants for activating the at least one spray nozzle and/or the amount of liquid mist or microorganisms per unit of time sprayed onto the at least one portion of the inner surface may be controlled and optimized by the control system with the purposes of improving the biologically treating the accumulated fat, oil and grease, yet avoiding that too much media comprising microorganisms from the spraying of the liquid mist by the nozzles is accumulating on the inner surfaces of the ventilation system, which may have an adverse effect on the efficiency of the process for purifying air.

Thus, the control system of the ventilation system may be configured to control and optimize the biologically treatment process for treating the accumulated fat, oil and grease, yet avoiding that too much media comprising microorganisms from the spraying on the inner surfaces of the ventilation system, which may have an adverse effect on the efficiency of the process for purifying air.

In embodiments, the frequency and/or time instants for activating the at least one spray nozzle and/or the amount of liquid mist or microorganisms per unit of time sprayed onto the at least one portion of the inner surface may then be controlled and optimized by the control system based on both an estimated accumulation of fat, oil and grease and/or the rate of increase per unit of the accumulated fat, oil and grease and the amount of previously used amounts of sprayed liquid mist or microorganisms, e.g. over a certain time period.

In certain embodiments, the frequency and/or time instants for activating the at least one spray nozzle and/or the amount of liquid mist or microorganisms per unit of time sprayed onto the at least one portion of the inner surface may then be controlled and optimized by the control system based on both an estimated accumulation of fat, oil and grease and/or the rate of increase per unit of the accumulated fat, oil and grease and an estimated, by the control system, current amount of media comprising microorganisms present on the inner surfaces of the ventilation system, e.g. over a certain time period. The estimated amount of media comprising microorganisms may then be based on sensor data obtained by the at least one sensor of the ventilation system or may be estimated by a remote processor of a master control unit and/or a backend system based on sensor data obtained by the at least one sensor of the ventilation system.

The technology disclosed relates to a ventilation system comprising ventilation ducts, a control system and at least one spray nozzle. The at least one spray nozzle is configured to spray a liquid mist onto at least one portion of an inner surface of the ventilation system. The liquid mist is containing a culture of microorganisms adapted for biologically treating fat, oil and grease present on at least one portion of the inner surface of the ventilation system, thereby providing for partial biodegradation of the fat, oil and grease present on the at least one portion of the inner surfaces of the ventilation system.

In embodiments, the ventilation system comprises at least one sensor configured to obtain sensor data adapted to be used for estimating at least one of the efficiency of the biological treatment process and the amount of accumulated fat, oil and grease on the at least one portion of the inner surfaces of the ventilation system.

In embodiments, the at least one sensor includes at least one of a temperature sensor, a pressure sensor, an acoustic wave sensor, an optical sensor, an ultrasonic sensor, a radar sensor and an inductive sensor configured to obtain sensor data. The obtained sensor data may be adapted to be used for estimating, by the control system, at least one of the efficiency of the biological treatment process and the amount of accumulated fat, oil and grease on the at least one portion of the inner surfaces of the ventilation system.

In embodiments, the ventilation system comprises at least one camera and/or microphone configured to obtain image and/or audio data to be used for estimating, by the control system, the amount of accumulated fat, oil and grease on the at least one portion of the inner surface.

In embodiments, the control system is configured to change the frequency and/or time instants for activating the at least one spray nozzle and/or the amount of liquid mist or microorganisms per unit of time sprayed onto the at least one portion of the inner surface based on at least one of obtained sensor data, image data and/or audio data and an estimated amount of accumulated fat, oil and grease. The estimation of the amount of accumulated fat, oil and grease may be based on obtained sensor data and may be estimated by the control system of the ventilation system or a remotely located processor.

In embodiments, control system is further configured to change, e.g. automatically change, at least one process variable, process scheme and/or process parameter used for controlling the frequency and/or time instants for activating the at least one spray nozzle and/or the amount of liquid mist or microorganisms per unit of time sprayed onto at least one portion of the inner surface based on at least one of the obtained sensor data, image data and/or audio data and an estimated amount of accumulated fat, oil and grease.

In embodiments, the ventilation system comprises a plurality of spray nozzles directed toward different portions of the inner surface of the ventilation system. The control system may then be further configured to control the plurality of spray nozzles so that different amounts of liquid mist is sprayed onto the different portions of the inner surfaces based on estimated, by the control system, different amounts of accumulated fat, oil and grease present on the different inner surfaces.

In embodiments, the ventilation system comprises a heat exchanger and at least one temperature sensor, infrared camera and/or detector for obtaining sensor data for determining the difference in air temperature before and after the heat exchanger and thereby at least one of the efficiency of the heat exchanger and the.

In embodiments, the control system is further configured to change the frequency and/or time instants for activating the at least one spray nozzle and/or the amount of liquid mist or microorganisms per unit of time sprayed onto at least one portion of the inner surfaces of the ventilation system based on the determined difference in air temperature before and after the heat exchanger.

In embodiments, control system is further configured to receive control data or instruction data from another ventilation system and/or a master control unit. the control system may then be further configured to, in response to said received control data or instruction data, change, e.g. automatically change, the frequency and/or time instants for activating the at least one spray nozzle and/or the amount of liquid mist or microorganisms per unit of time sprayed onto at least one portion of the inner surfaces of the ventilation system.

In embodiments, the control system is further configured to receive control data or instruction data from another wastewater treatment system and/or a master control unit. The control system may then be further configured to, in response to the received control data or instruction data, change, e.g. automatically change, at least one process variable, process scheme and/or process parameter for controlling the frequency and/or time instants for activating the at least one spray nozzle and/or the amount of liquid mist or microorganisms per unit of time sprayed onto at least one portion of the inner surfaces of the ventilation system.

In embodiments, at least one spray nozzle of a plurality of spray nozzle is adapted to be used for flushing off, with a flushing liquid, hydrolyzed fat present on the inner surfaces of the ventilation ducts. The control system may then be further configured to change the frequency and/or time instants for activating the at least one spray nozzle and/or the amount of flushing liquid per unit of time sprayed onto the at least one portion of the inner surface based on at least one of obtained sensor data, image data and/or audio data and an estimated amount of accumulated fat, oil and grease.

The technology disclosed also relates to a method in a ventilation system comprising ventilation ducts, a control system and at least one spray nozzle, the method comprising the steps of:

a) spraying, by at least one spray nozzle, a liquid mist onto at least one portion of an inner surface of the ventilation system, wherein the liquid mist is containing a culture of microorganisms adapted for biologically treating fat, oil and grease present on the at least one portion of the inner surface of the ventilation system, thereby providing for partial biodegradation of the fat, oil and grease present on the at least one portion of the inner surface.

In various embodiments, the ventilation system further comprises at least one sensor, camera and/or microphone, and the method comprises the following steps:

b) obtaining, by the at least one sensor, camera, and/or microphone and/or acoustic wave sensor, sensor data, audio data and/or image data;

c) estimating, by the control system, at least one of the efficiency of the biological treatment process and the amount of accumulated fat, oil and grease on at least one portion of the inner surfaces of the ventilation system, wherein the estimation is based on said obtained sensor data, audio data and/or image data; and d) changing, by the control system, the frequency and/or time instants for activating the at least one spray nozzle and/or the amount of liquid mist or microorganisms per unit of time sprayed onto the at least one portion of the inner surface based on at least one of obtained sensor data, image data and/or audio data and an estimated amount of accumulated fat, oil and grease.

In embodiments, the method comprise the following steps:

e) determining, by the control system, an estimated rate of increase of the amount of fat, oil and grease accumulated on different inner surfaces and/or on the inner surfaces of the ventilation system; and f) changing, by the control system, the frequency and/or time instants for activating the at least one spray nozzle and/or the amount of liquid mist sprayed onto different inner surfaces of the ventilation system and/or on the inner surfaces of the ventilation system based on the determined estimated rate of increase in the amount of accumulated fat, oil and grease.

In embodiments, the ventilation system further comprises a heat exchanger and at least one temperature sensor, infrared camera and/or detector for determining the difference in air temperature before and after the heat exchanger, and the method may comprise the following steps:

g) obtaining, by the at least one temperature sensor, infrared camera and/or detector, sensor data;

h) determining, by the control system, the difference in air temperature before and after the heat exchanger; and i) changing, by the control system and based on at least one of the obtained sensor data and the determined difference in air temperature, the frequency and/or time instants for activating the at least one spray nozzle and/or the amount of liquid mist or microorganisms per unit of time sprayed onto at least one portion of the inner surface.

In embodiments, the at least one spray nozzle is adapted to be used for flushing off, with a flushing liquid, hydrolyzed fat present on the inner surfaces of the ventilation ducts, and the method may comprise the following steps:

j) changing, by the control system, the frequency and/or time instants for activating the at least one spray nozzle and/or the amount of flushing liquid per unit of time sprayed onto the at least one portion of the inner surface based on at least one of obtained sensor data, image data and/or audio data and an estimated amount of accumulated fat, oil and grease.

In embodiments, the method comprises:

k) receiving, by the control system and from another ventilation system and/or a master control unit, control data or instruction data; and l) changing, by the control system, the frequency and/or time instants for activating the at least one spray nozzle and/or the amount of liquid mist or microorganisms per unit of time sprayed onto the at least one portion of the inner surface based on the received control data or instruction data.

In embodiments, the method comprises:

m) receiving, by the control system and from another ventilation system and/or a master control unit, control data or instruction data; and n) changing, by the control system and in response to receiving said control data or instruction data, at least one process variable, process scheme and/or process parameter for controlling the activation of spray nozzles and the biological treatment process.

In embodiments, the method may comprise:

a) determining, by the control system, the amount of media comprising microorganisms previously used for spraying the liquid mist onto the inner surfaces of the ventilation system over a certain past time period; and b) changing, by the control system, the frequency and/or time instants for activating the at least one spray nozzle and/or the amount of liquid mist or microorganisms per unit of time sprayed onto the at least one portion of the inner surface on both an estimated accumulation of fat, oil and grease and/or the rate of increase per unit of the accumulated fat, oil and grease and the determined amount of media comprising microorganisms previously sprayed onto the inner surfaces of the ventilation system.

In embodiments, the method comprises:

a) estimating, by the control system, the amount of media comprising microorganisms present on the inner surfaces of the ventilation system, wherein said estimation is based on the obtained sensor data; and b) changing, by the control system, the frequency and/or time instants for activating the at least one spray nozzle and/or the amount of liquid mist or microorganisms per unit of time sprayed onto the at least one portion of the inner surface on both an estimated accumulation of fat, oil and grease and/or the rate of increase per unit of the accumulated fat, oil and grease and a determined or estimated current amount of media comprising microorganisms present on the inner surfaces of the ventilation system.

In embodiments, the control system or unit is configured to determine that at least one of a change of the composition of microorganisms and a spontaneous mutation of the culture of microorganisms initially added to the biological treatment process has occurred.

In embodiments, the control system or unit is configured to at least one of change at least one process variable, process scheme and/or process parameter used for controlling the biological treatment process or determine that a sample containing a culture of microorganisms may or should be collected from the inner surface area of a duct or tube.

In embodiments, the control system or unit is further configured to determine that the culture of microorganisms is performing well and that a sample containing the culture of microorganisms may or should be collected from the inner surface area of the ventilation system, and wherein said determining that a sample of the culture of microorganisms may or should be collected is at least partly based on said sensor data obtained by the at least one sensor device, camera and/or microphone.

In embodiments, the control system or unit is further configured to identify and/or store at least one process variable, process scheme and/or process parameter related to an ongoing biological treatment process determined to be performing well and which involves the collected sample containing the culture of microorganisms.

In embodiments, the control system or unit is further configured to determine that the identified and/or stored at least one process variable, process scheme and/or process parameter of a first biological treatment process in a first ventilation system may be used in a second biological treatment process in another ventilation system for biologically breaking down fat, oil and/or grease to thereby improve or optimize the second biological treatment process using the collected culture of microorganisms.

In embodiments, the control system or unit of the system is configured to send data or information at least partly based on the obtained sensor data, and wherein said control system or unit is configured to send said data or information to at least one of another ventilation system for biologically treating fat, oil and/or grease by adding a culture of microorganisms and a remotely located master control unit for controlling a plurality of sub-systems for biologically treating fat, oil and/or grease.

In embodiments, the control system or unit of the system is configured to receive control or instruction data from at least one other remotely located ventilation system or subsystem for biologically treating fat, oil and/or grease and a remotely located master control unit for controlling a plurality of ventilation systems for biologically treating fat, oil and/or grease, and wherein said control system or unit is further configured to determine that a sample containing a culture of microorganisms may or should be collected at least partly based on the control or instruction data received from at least one of the at least one other remotely located system or sub-system for biologically treating fat, oil and/or grease and the remotely located master control unit.

In embodiments, the technology disclosed relates to a ventilation system that may be configured to detect a change in a biological process at least partly based on obtained sensor data related to the biological process, where the obtained sensor data may explicitly indicate a change in the biological process. An indication of a change in the biological process, which is at least partly based on the obtained sensor data, may trigger the collecting of a sample and, optionally, a further analysis of the collected sample. The analysis of the sample may determine if a change in the microculture has occurred, e.g. a change in the composition of microorganisms (e.g. a change in the ratio of different microorganisms which may include the composition of microorganisms initially added to the biological treatment process) and/or a spontaneous mutation of the microculture initially added to biological treatment process, has occurred that could be used as either a starting culture in any other biosystem, e.g. at other sites, or as a sample for further product development of a microculture in the collected sample. The ventilation system, or a master control unit communicatively coupled to the ventilation system, of the technology disclosed may be configured to determine, at least partly based on obtained sensor data, that a change in the biological process has occurred. The collected sample containing the microculture, or culture of microorganisms, may then be collected from an inner surface of the ventilation system and the collected sample may be suitable for biologically treating fat, oil and/or grease (FOG), suitable for breaking down fat, oil and/or grease and/or suitable for partial biodegradation of fat, oil and/or grease In embodiments, the technology disclosed relates to methods for detecting a change in a biological process at least partly based on obtained sensor data related to the biological process, where the obtained sensor data may explicitly indicate a change in the biological process. A change in the biological process which may be determined at least based on the obtained, e.g. collected or received sensor data, may trigger the collecting of a sample and, optionally, and may further trigger the performing of an analysis of the collected sample. The performed analysis of the sample may determine if a change in the microculture has occurred, e.g. a change in the composition of microorganisms (e.g. a change in the ratio of different microorganisms which may include microorganism in the composition of microorganisms initially added to the biological treatment process) and/or a spontaneous mutation of the microculture which was initially added to the biological treatment process, has occurred that could be used as either a starting culture in any other biosystem, e.g. at other sites, or as a sample for further product development of a microculture in the collected sample. The ventilation system, or a master control unit communicatively coupled to the ventilation system, of the technology disclosed may determine, at least partly based on obtained sensor data, that a change in the biological process has occurred. The collected sample containing the microculture, or culture of microorganisms, may then be collected from an inner surface area of the ventilation system and the collected sample may be suitable for biologically treating fat, oil and/or grease (FOG), e.g. suitable for breaking down fat, oil and/or grease and/or suitable for partial biodegradation of fat, oil and/or grease. In certain embodiments, the master control unit may be configured to at least one of receive and exchange data or information directly from at least one other device or system which is not a biological treatment system.

In embodiments, the control system or unit of the ventilation system for breaking down fat, oil and/or grease (FOG) is configured to receive or collect the sensor data from the at least one sensor device, camera and/or microphone.

In embodiments, the control system or unit is configured to continuously and/or periodically receive or collect the sensor data from the at least one sensor device, camera and/or microphone.

In embodiments, the control system or unit is configured at least one of identify and store at least one process variable, process scheme and/or process parameter related to the ongoing biological treatment process.

In embodiments, the control system or unit is configured at least one of identify and store at least one process variable, process scheme and/or process parameter controlling the biological treatment process at least partly based on sensor data obtained by the at least one sensor device, camera and/or microphone.

In embodiments, the control system or unit of a ventilation system for biologically treating fat, oil and/or grease is configured to change at least one process variable, process scheme and/or process parameter for controlling the biological treatment process at least partly based on sensor data obtained by the at least one sensor device, camera and/or microphone.

In certain embodiments, the decision by the control system or unit of a ventilation system whether to change at least one process variable, process scheme and/or process parameter value may in addition be at least partly based on data or information exchanged with and/or received from at least one other device or system, wherein the other device or system may include at least one of the booking system for at least one restaurant, a weather report system, and/or a control system/unit for monitoring air pollution in air or air streams.

In embodiments, the control system or unit of the ventilation system may be configured to send data or information at least partly based on the obtained at least one of sensor data, image data and audio data. The control system or unit may then be configured to send the data or information to at least one of another ventilation system for biologically treating down fat, oil and/or grease by spraying a liquid mist containing microorganisms and a remotely located master control unit for controlling a plurality of ventilation systems configured to biologically treating accumulated fat, oil and/or grease.

In certain embodiments, the decision by the control system or unit of a ventilation system for biologically treating fat, oil and/or grease whether to send data or information to at least one of another system for biologically treating down fat, oil and/or grease to change at least one process variable, process scheme and/or process parameter value may in addition be at least partly based on data or information exchanged with and/or received from at least one other device or system, wherein the at least one other device or system may include at least one of the booking system for at least one restaurant, a weather report system, and/or a control system/unit for monitoring air pollution in air or air streams.

In different embodiments, the technology disclosed relates to a method in a ventilation system for biologically breaking down fat, oil and/or grease by spraying a liquid mist containing a culture of microorganisms onto at least one portion of the inner surfaces of the ventilation ducts or ventilation tubes of the ventilation system comprising at least one sensor device, camera and/or microphone, said method comprising the steps of:
 a) obtaining sensor data from the at least one sensor device, camera and/or microphone, and
 b) changing at least one process variable, process scheme and/or process parameter for controlling the biological treatment process at least partly based on said sensor data obtained by the at least one sensor device, camera and/or microphone.

In different embodiments, the technology disclosed relates to a method in a ventilation system configured for biologically breaking down fat, oil and/or grease by spraying a liquid mist containing a culture of microorganisms onto at least one portion of the inner surfaces of the ventilation ducts, said method comprising the steps of:
 a) receiving control or instruction data from at least one of another remotely located ventilation system or control unit, and
 b) changing at least one process variable, process scheme and/or process parameter for controlling the biological treatment process at least partly based on the received control or instruction data.

In different embodiments, the technology disclosed relates to a method in a ventilation system configured for biologically breaking down fat, oil and/or grease by spraying a liquid mist containing a culture of microorganisms comprising at least one sensor device, camera and/or microphone, said method comprising the steps of:
 a) obtaining sensor data from the at least one sensor device, camera and/or microphone, and
 b) determining that a culture of microorganisms is performing well and that a sample containing the culture of microorganisms may or should be collected from the biological treatment zone or surface area of a biological treatment zone or surface area of the biological treatment system, wherein said determining is at least partly based on said sensor data obtained by the at least one sensor device, camera and/or microphone.

In embodiments, the master control unit is comprising at least one processor configured for processing said data and/or information received from the ventilation system, and wherein said data and/or information is at least partly based on sensor data obtained by a sensor device, camera and/or microphone of said ventilation system. In certain embodiments, the at least one processor is configured to use at least one of soft sensor data, historic data, machine learning algorithms, deep learning algorithms and artificial intelligence for processing said data and/or information received from said ventilation system.

In embodiments of the technology disclosed related to as system for purifying air, at least one camera may be used in a ventilation pipe with a view over nozzles for dosing/spraying a liquid culture of microorganisms and/or water vapor for improving the biological process for breaking down FOG. The at least one camera may also be located to be used of determining the thickness of the layer of accumulated FOG in the ventilation ducts/tubes/pipes, e.g. be located inside the ducts/tubes/pipes and directed at the inside surface area of the bend of the ducts/tubes/pipes where it is more likely that FOG is accumulated. The nozzles for dosing/spraying a (liquid) culture of microorganisms and/or water vapor may be strategically located inside the ducts/tubes/pipes and directed at these surface areas where it is more likely that FOG is accumulated than other parts of the system. In other example embodiments, the nozzles for dosing/spraying a (liquid) culture of microorganisms and/or water vapor are located and directed at a heat exchanger or filter of the system for purifying air. Heat exchangers and filters tend to accumulate more fat, oil and grease than other parts of the system for purifying air. In different embodiments, at least one of the at least one camera is an infrared camera or detector for detecting heat changes in the system for purifying air.

In the different embodiments of the technology disclosed, the analysis of image data and/or video data obtained by the at least one camera directed at the nozzles, the inside surface area of the bends, a filter and/or a heat exchanger may be done by a control system/unit of the system for purifying air, e.g. a ventilation system. Alternatively, sensor data which at least partly based on obtained image data or video data is sent to a remotely located master control unit and/or up to the cloud where it is analyzed. Initially, an operator may, if necessary, analyze the image data and/or video image data and, optionally, provide his/her input to which sensor data, which is at least partly based on the obtained image/video data, is sent to the remotely located master control unit and/or up to the cloud.

In embodiments, the at least one air purifying system according to the technology disclosed may comprise at least one oxygen detector for detecting the concentration of oxygen. The at least one oxygen detector may be configured to detect or measure the concentration of oxygen in the air streams.

In embodiments, the sensor data in the form of the measured/detected concentration of oxygen in the air streams may be used for controlling the biological treatment process for breaking down FOG in a ventilation system for treatment of accumulated FOG in the same system or in a different system from the ventilation system the oxygen detector is located. In an air purifying system, the oxygen detector may be used under the control of a pH detector, or in combination with a pH detector to compile sensor data to determine the amount of odor, where the compiled sensor data is sent to the control system of the ventilation system and/or to a remotely located master control unit for analysis.

In embodiments, the control system of the treatment system and/or the master control unit may then be configured to send control/instruction data, at least partly based on the received sensor data (which in turn is at least partly based on a measured/detected concentration of oxygen) for changing a biological treatment process in the same treatment system or changing a biological treatment process in another treatment system for breaking down FOG.

In embodiments, the biological treatment systems for breaking down FOG in a system for purifying air according to the technology disclosed may comprise at least one sensor for measuring the air temperature of air streams in the air ducts of a ventilation system. A measured air temperature, or change in air temperature, by the at least one sensor may trigger the control system of the ventilation system, or a remotely located master control unit, to initiate a change in product type, e.g. change and/or add a new culture/composition of microorganisms used for biologically breaking down FOG in a system for purifying air. The new culture/composition of microorganisms dosed/added to the biological treatment zone of the system may be known by the control system and/or master control unit to provide improved bacterial growth at the measured air temperature compared to the currently used culture/composition of microorganisms used in the system for biologically breaking down FOG. In different embodiments, at least one of the at least one sensor for measuring/detecting air temperature may be an infrared camera or detector for detecting heat changes in a system for purifying air.

In embodiments, the obtained air temperature may be used for controlling the ventilation process in a system for purifying air. As an example, temperature sensors for measuring the air temperature may be located both before and after a heat exchanger in a system for purifying air. A big difference in air temperature before and after the heat exchanger may be an indicator that the heat exchanger is not coated with fat and is performing well. A small difference in air temperature before and after the heat exchanger, e.g. a delta in temperature below a certain threshold value, may indicate to the control system or a master control unit of the system for purifying air that the heat exchanger is coated with fat and may trigger the control system to change the ventilation process and/or intensify or change the biological treatment process for breaking down fat in the heat exchanger, e.g. by changing process variables and/or sending control/instruction data for changing/modifying culture/composition of microorganisms which is currently used in the system for purifying air and/or changing/modifying the culture/composition of microorganisms used in another system for purifying air. Sensor data at least partly based on the obtained air temperature, delta temperature or changed temperature may then be sent to a control system/unit of the system for purifying air or a remotely located master control unit. The control system/unit of the system for purifying air and/or the master control unit may then be configured to send control/instruction data, at least partly based on the received sensor data (which in turn is at least partly based on a measured/detected air temperature) for changing a biological treatment process in the same system for purifying air or changing the process for breaking down FOG in another system for purifying air.

In embodiments, a system for purifying air may be configured with at least one humidity detector for determining the conditions for bacterial growth and sensor data at least partly based on the detected humidity, e.g. the concentration of water in the air stream, may be sent to the control system/unit of the system for purifying air and/or a master control unit. The system for purifying air according to embodiments of the technology disclosed is provided with nozzles for dosing/spraying a certain composition/culture of microorganisms onto areas where FOG is likely to be accumulated, e.g. the surface area inside bends of the ducts/tubes/pipes, in filters or in heat exchangers of the air purification system. To further improve bacterial growth, the system may further comprise nozzles for distributing water vapor onto or close to these areas where FOG is likely to be accumulated.

In certain embodiments, sensor data obtained by the at least one sensor for measuring air temperature may be combined and/or analyzed together with sensor data obtained from the at least one humidity detector. An optimal biological degradation depends on the microorganisms having the right conditions for high growth. One important factor is the humidity level, but the microorganisms often require both carbon, phosphorus and nitrogen for their growth. To improve the conditions for bacterial growth, the system for purifying air according to example embodiments of the technology disclosed may be provided with nozzles for distributing water vapor close to areas where FOG is likely to be accumulated, e.g. the surface area inside bends, in filters or in heat exchangers, thereby increasing the humidity level and the conditions for bacterial growth in these areas. To control the conditions for bacterial growth, the system for purifying air according to example embodiments of the technology disclosed may also be provided with humidity detectors which are located close to areas where FOG is likely to be accumulated, e.g. inside the ducts/tubes/pipes close to bends, close or inside filter or heat exchangers. Sensor data which is at least partly based on the sensor data obtained by the humidity detector may then be sent to a control system/unit of the system for purifying air or a remotely located master control unit. The control system/unit of the system for purifying air and/or the master control unit may then be configured to send control/instruction data, at least partly based on the received sensor data (which in turn is at least partly based on the detected humidity), for changing a biological treatment process in the same system for purifying air or changing the process for breaking down FOG in another system for purifying air.

In embodiments of the technology disclosed related to systems for purifying air, e.g. ventilation systems, at least one sensor device comprising a sensor for detecting sound/audio, e.g. a microphone, a sound impulse detector or probe, may be located/positioned in or on the outside of the ventilation tubes, or ducts. The at least one microphone may be placed in or on the outside of the ventilation tube. The ventilation sound is affected by layers of fat, oil and grease (FOG) on the inside surface of the ventilation tube, in the heat exchanger and in the filters. The measured/detected amounts of FOG in the heat exchanger and filters and/or the thickness of the layer of FOG in the ducts/tubes/pipes may be used by the control system/unit or to control the amount of microorganisms dosed/sprayed per unit of time, the amounts of water vapor sprayed per unit of time, but may also be used as input for determining, by the control system/unit or master control unit, whether to increase or decrease the process time for the biological treatment process. Sensor data which is at least partly based on the obtained audio/sound or audio characteristics may then be sent to a control system/unit of the system for purifying air or a remotely located master control unit. The control system/unit of the system for purifying air and/or the master control unit may then be configured to send control/instruction data, at least partly based on the received sensor data (which in turn is at least partly based on the detected audio/sound data), for changing a biological treatment process in the same system for purifying air or changing the process for breaking down FOG in another system for purifying air.

In embodiments, an externally supplied sound impulse may be generated for travelling through the air ducts/tubes and changes to the sound impulse may be analysed by the sensor device/sound impulse detector, the control system/unit of the system for purifying air and/or a remotely located master control unit. Sensor data at least partly based on the obtained changes to the generated sound impulse may then be sent to a control system/unit of the system for purifying air or a remotely located master control unit. The control system/unit of the system for purifying air and/or the master control unit may then be configured to send control/instruction data, at least partly based on the received sensor data (which in turn is at least partly based on detected changes to the generated sound impulse) for changing a biological treatment process in the same system for purifying air or changing the process for breaking down FOG in another system for purifying air.

In different embodiments, the obtained audio/sound data according to certain aspects of the technology disclosed may then be audio data or audio characteristics obtained by the at least one microphone or probe and the data or information sent from a control system of the ventilation system to at least one of a master control unit and a control system of another ventilation system is at least partly based on the obtained audio data, or audio characteristics. Sound travelling through the tubes/ducts is affected by fat/grease accumulated on the inside of the ducts/tubes/pipes. In accordance with the technology disclosed, bacteria for biologically breaking down fat/FOG are dosed in the ventilation ducts, e.g. by spraying bacteria for breaking down fat/FOG on the air filter, in the heat exchanger and/or on the inside of the ventilation ducts/tubes/pipes where they break down the fat/FOG, which reduces the fat/FOG accumulation and the need for cleaning. The bacteria may then be used to break down the fat/FOG into small water-soluble carbon chains.

In embodiments, the at least one microphone or probe, optionally in combination with data processing, may be used by the system for purifying air for measuring the current thickness of the fat/FOG/grease accumulated on the inside of the ducts/tubes/pipes, the current thickness of the layer of fat and grease (FOG) in the heat exchanger, the amount of fat/FOG/grease accumulated in the air filters, and/or for detecting noise in the system for purifying air. Sensor data at least partly based on the obtained changes to the generated sound impulse may then be sent to a control system/unit of the system for purifying air or a remotely located master control unit. The control system/unit of the system for purifying air and/or the master control unit may then be configured to send control/instruction data, at least partly based on the received sensor data (which in turn is at least partly based on the obtained audio data and/or audio characteristics) for changing a biological treatment process in the same system for purifying air or changing the process for breaking down FOG in another system for purifying air. The methods of the technology disclosed is adapted to increase the efficiency of the process for biologically breaking down FOG/fat/grease in a system for purifying air and in the ventilation ducts/tubes/pipes.

In different embodiments of the technology disclosed, the analysis of audio data obtained by the at least one microphone or probe may be done by a control system, such as a controller in a control cabinet, of the system for purifying air. Alternatively, sensor data which at least partly based on obtained audio data or image data is sent to a remotely located master control unit and/or up to the cloud where it is analyzed. Initially, an operator may, if necessary, analyze the audio data and, optionally, provide his/her input to which sensor data, which is at least partly based on the obtained audio data, is sent to the remotely located master control unit and/or up to the cloud.

In embodiments, the control system of a ventilation system may be configured to determine, at least partly based on audio data obtained by the at least one microphone or probe of the ventilation system, that at least one process variable/parameter of the ventilation system should be changed, e.g. process variables/parameters for controlling the amount of water vapor per time unit sprayed onto a certain inner surface area of the ducts/tubes/pipes from spray nozzles located on the inside of the ducts/tubes/pipes, process variables/parameters for controlling the amount of microorganisms per time unit distributed/sprayed onto a certain inner surface area of the ducts/tubes/pipes from spray nozzles located on the inside of the ducts/tubes/pipes, process variables/parameters for controlling the amount of microorganisms per time unit provided to, or sprayed onto, a filter of the ventilation system and/or process variables/parameters for controlling the amount of microorganisms per time unit provided to, or sprayed onto, a filter of the ventilation system. These methods of the technology disclosed are adapted to increase the efficiency of the process for biologically breaking down FOG/fat/grease in the ventilation ducts/tubes/pipes.

In embodiments, the control system of the ventilation system may be configured to send control/instruction data for changing at least one process variable/parameter at least partly based on audio data obtained by the at least one microphone or probe. In embodiments, a master control unit may be configured to receive audio data from the ventilation system and send control/instruction data, to the ventilation system, indicating that it is time to collect a liquid sample of microbe cultures of microorganisms from a filter or inner surface of a duct/tube of the ventilation system at least partly based on audio data obtained by the at least one microphone.

In certain embodiments, the control system of the ventilation system may be configured to generate and/or send a message such as a push message and/or control/instruction data for alerting an operator (e.g. via an application program of the mobile communication device of the operator) that a sample of microorganisms should be collected from filter or inner surface of a duct/tube at least partly based on audio data obtained by the at least one microphone or probe of the ventilation system.

In certain embodiments, the control system of the ventilation system may be configured to present display data on a display indicating that it is time to collect a sample containing microorganisms from a filter or inner surface of a duct/tube of the ventilation system in response to audio data obtained by the at least one microphone or probe of the ventilation system is indicating that it is time to collect a sample containing microorganisms from the filter or inner surface of duct/tube of the ventilation system.

In various embodiments, a sound impulse generated by a sound source of the ventilation system may be used in combination with at least one microphone or probe, for measuring the thickness of the fat/FOG/grease accumulated on the inside of the ducts/tubes/pipes, the fat/FOG/grease accumulated in the air filters, and/or for detecting noise in the ventilation system. In certain embodiments, the microphone or probe may be located near pumps or in control cabinets of the ventilation system to thereby be in a location suitable for detecting noise and/or changes in the audio data obtained from the ducts/tubes/pipes of the ventilation system.

In embodiments, the control system of a ventilation system may be configured to determine, at least partly based on the image data obtained by the at least one camera of the ventilation system, that at least one process variable/parameter of the ventilation system should be changed, e.g. process variables/parameters for controlling the amount of water vapor per time unit sprayed onto a certain inner surface area of the ducts/tubes/pipes from spray nozzles located on the inside of the ducts/tubes/pipes, process variables/parameters for controlling the amount of microorganisms per time unit distributed/sprayed onto a certain inner surface area of the ducts/tubes/pipes from spray nozzles located on the inside of the ducts/tubes/pipes, process variables/parameters for controlling the amount of microorganisms per time unit provided to, e.g. sprayed onto, a filter of the ventilation system and/or process variables/parameters for controlling the amount of microorganisms per time unit provided in, or sprayed onto, a filter of the ventilation system. These methods of the technology disclosed are adapted to increase the efficiency of the process for biologically breaking down FOG/fat/grease in the ventilation ducts/tubes/pipes.

In embodiments, the control system of a second ventilation system may be configured to determine, at least partly based on the image data obtained by the at least one camera of a first ventilation system and data or information received from the first ventilation system, that at least one process variable/parameter of the second ventilation system should be changed, e.g. process variables/parameters for controlling the amount of water vapor per time unit sprayed onto a certain surface area on the inside of the ducts/tubes/pipes by spray nozzles preferably located on the inside of the ducts/tubes/pipes, process variables/parameters for controlling the amount of microorganisms per time unit distributed/sprayed onto a certain inner surface area of the ducts/tubes/pipes by spray nozzles preferably located on the inside of the ducts/tubes/pipes, process variables/parameters for controlling the amount of microorganisms per time unit provided to, or sprayed onto, a filter of the ventilation system and/or process variables/parameters for controlling the amount of microorganisms per time unit provided to, or sprayed onto, a filter of the ventilation system.

In embodiments, the nozzles for injecting/spraying water vapor and/or microorganisms for the purpose of improving the process for breaking down accumulated FOG/fat may be selectively located in the ventilation system so that they are adapted to increase the concentration of microorganisms on certain selected surface areas on the inside of the ducts/tubes which are more likely to accumulate FOG/fat/grease, e.g. filters or the inner region/surface area of a bend of a duct or tube. The inner region/surface area of the bends of ventilation ducts/tubes, in particular the inner surface area of sharp bends of a ventilation ducts/tube, are more likely to accumulate FOG/fat/grease than other inner surface areas of the ducts/tubes.

In certain embodiments of the technology disclosed, a pressure sensor may be used for measuring air pressure in a system for purifying air, e.g. the air pressure between air pump and air plate in the ventilation system. The pressure sensor may then preferably be located/positioned between the compressor and the outlet valve of the system and may be configured to detect abnormal pressure. Sensor data may be at least partly based on the detected pressure and/or an operator may be alerted when abnormal pressure is detected.

In certain embodiments of the technology disclosed, at least one pressure sensor may be used for measuring air pressure in a ventilation system. The at least one pressure sensor may be installed for the purpose of measuring the pressure in ventilation ducts/tubes and/or a decrease in the efficiency of a heat exchanger of the ventilation system. The at least one pressure sensor may then be located/positioned and configured to detect sudden changes in pressure in the ventilation system. Sensor data may be at least partly based on the detected pressure drop/change.

In embodiments, the system for biologically treating fat, oil and/or grease may be communicatively coupled to a master control unit remotely located from at least one of a plurality of systems for biologically treating fat, oil and/or grease including a first and a second system. The master control unit may be configured to receive, from at least one of the plurality of systems, data such as sensor data related to a treatment or separation process for at least one of said plurality of systems. The plurality of systems may include a plurality of systems for purifying air.

In embodiments, the technology disclosed relates to a system comprising a master control unit remotely located from at least one of a plurality of sub-systems including a first and a second sub-system. The master control unit may be configured to receive, from at least one of the plurality of sub-systems, data related to a treatment or separation process for at least one of said plurality of sub-systems. The plurality of sub-systems may include at least one of a plurality of ventilation systems. The system may then comprise a plurality of ventilation systems including a first and a second ventilation system and the master control unit may be configured to receive, from at least one of the plurality of ventilation systems, data or information related to the air purification process for at least one of the plurality of ventilation systems. The data may indicate that it is time to collect an air sample containing microorganisms from the first ventilation system and the system may be configured to add the collected air sample containing microorganisms to said second ventilation system.

In embodiments, the technology disclosed relates to a system comprising a master control unit remotely located from at least one of a plurality of sub-systems including a first and a second sub-system. The master control unit is configured to receive, from at least one of the plurality of sub-systems, data related to a treatment or separation process for at least one of the plurality of sub-systems. The plurality of sub-systems may include at least one of a plurality of ventilation systems.

In embodiments, the technology disclosed relates to a method in a system comprising a plurality of sub-systems for purifying air, the method comprising the steps of:

a. collecting and/or identifying at least one of sensor data, image data and process variables related to a treatment process of a first sub-system, and b. receiving, at a second sub-system, data and/or information related to at least one of the collected and/or identifying at least one of sensor data, image data and process variables related to the treatment process of the first sub-system communicatively coupled to the control unit of the second subs-system.

In embodiments, the technology disclosed relates to a method in a system comprising a plurality of sub-systems for purifying air, the method comprising the steps of:

a. collecting and/or identifying at least one of sensor data, image data and process variables related to a treatment process of a first sub-system, b. receiving, at a second sub-system, data and/or information related to at least one of the collected and/or identifying at least one of sensor data, image data and process variables related to the treatment process of the first sub-system communicatively coupled to the control unit of the second subs-system, and c. identifying, by the control unit of the second sub-system and at least partly based on the received at least one of sensor data, image data and process variables, that a process variable for a treatment process of the second sub-system should be changed.

In embodiments, the technology disclosed relates to a method in a system comprising a plurality of sub-systems for purifying air, the method comprising the steps of:

a. collecting and/or identifying at least one of sensor data, image data and process variables related to a treatment process of a first sub-system, b. receiving, at a second sub-system, data and/or information related to at least one of the collected and/or identifying at least one of sensor data, image data and process variables related to the treatment process of the first sub-system communicatively coupled to the control unit of the second subs-system, and c. identifying, by the control unit of the second sub-system and at least partly based on the received at least one of sensor data, image data and process variables, that a sample comprising a composition/culture of microorganisms should be collected from a treatment process of the first sub-system and added to treatment process of the second sub-system.

In embodiments, the technology disclosed relates to a method in a system comprising a plurality of sub-systems for purifying air, the method comprising the steps of:

a. receiving, at a second sub-system, at least one of sensor data, image data and process variables related to a treatment process of a first sub-system communicatively coupled to the control unit of the second subs-system, and b. identifying, by control unit of the second sub-system and at least partly based on the received at least one of sensor data, image data and process variables, that a sample comprising a composition/culture of microorganisms should be collected from a treatment process of the first sub-system and added to treatment process of the second sub-system.

In embodiments, the technology disclosed relates to a method in a system comprising a master control unit and a plurality of sub-systems, the method comprising the steps of:

a. receiving, at a master control unit, at least one of sensor data, image data and process variables related to a treatment process of a first sub-system communicatively coupled to the master control unit, and b. identifying, at the master control unit and at least partly based on the received at least one of sensor data, image data and process variables, that a sample comprising a composition/culture of microorganisms should be collected from a treatment process of the first sub-system.

In embodiments, the technology disclosed relates to a method in a system comprising a master control unit and a plurality of ventilation systems, the method comprising the steps of:

a. receiving, at a master control unit, at least one of sensor data, image data and process variables related to a treatment process of a first ventilation system communicatively coupled to the master control unit, b. identifying, at the master control unit and at least partly based on the received at least one of sensor data, image data and process variables, that a sample comprising a composition of microorganisms should be collected from a treatment process of the ventilation system.

In certain embodiments, the above method may further comprise the steps of collecting a sample containing the composition of microorganisms from the first ventilation system and adding the collected sample with the composition of microorganisms to a treatment process of a second ventilation system remotely located from the first ventilation system. Advantages of this method include that a spontaneous mutation of a composition/culture of microorganisms initially added to a first treatment process of a ventilation system is indicated by received sensor data and/or process variables to improve the treatment process, may be collected or extracted from the first biological treatment process and added to a second biological treatment process of a second ventilation system, e.g. a second ventilation system remotely located from the first ventilation system. In certain embodiments, said step of identifying comprises performing calculations based on said received at least one of sensor data, image data and process variables to determine whether a sample comprising a composition of microorganisms should be collected from the first biological treatment process of the first ventilation system. In embodiments, the system comprises a plurality of sub-systems including a first and a second sub-system which are remotely located from each other. Each of the plurality of subs-systems may then comprise a control unit communicatively coupled to and configured to receive, from at least one of the other sub-systems, data related to a treatment or separation process of the other sub-system. The control unit typically comprises a processor for processing data and may also be configured for performing calculations. In certain embodiments, the plurality of sub-systems includes a plurality of ventilation systems.

In embodiments, the system comprises a plurality of ventilation systems including a first and a second ventilation system. Each control unit of the plurality of ventilation systems may then be configured to receive, from at least one other ventilation systems, data or information related to the ventilation process for the other ventilation system. The data may then indicate that it is time to collect an air sample containing microorganisms from a first ventilation system. In certain embodiment, the system may be configured to add the collected air sample containing microorganisms to the second ventilation system.

In embodiments, the system comprises a plurality of ventilation systems including a first and a second ventilation system. The control unit of a second ventilation system may then be configured to receive, from a first ventilation system among the plurality of ventilation systems, data or information related to the ventilation process for the first ventilation system, where the data is indicating that it is time to collect an air sample containing microorganisms from the first ventilation system. In certain embodiment, the system is configured to add the collected air sample containing microorganisms to the second ventilation system.

BRIEF DESCRIPTION OF DRAWINGS

Embodiments of the invention will now be described in more detail with reference to the appended drawings, wherein.

Figure 1:
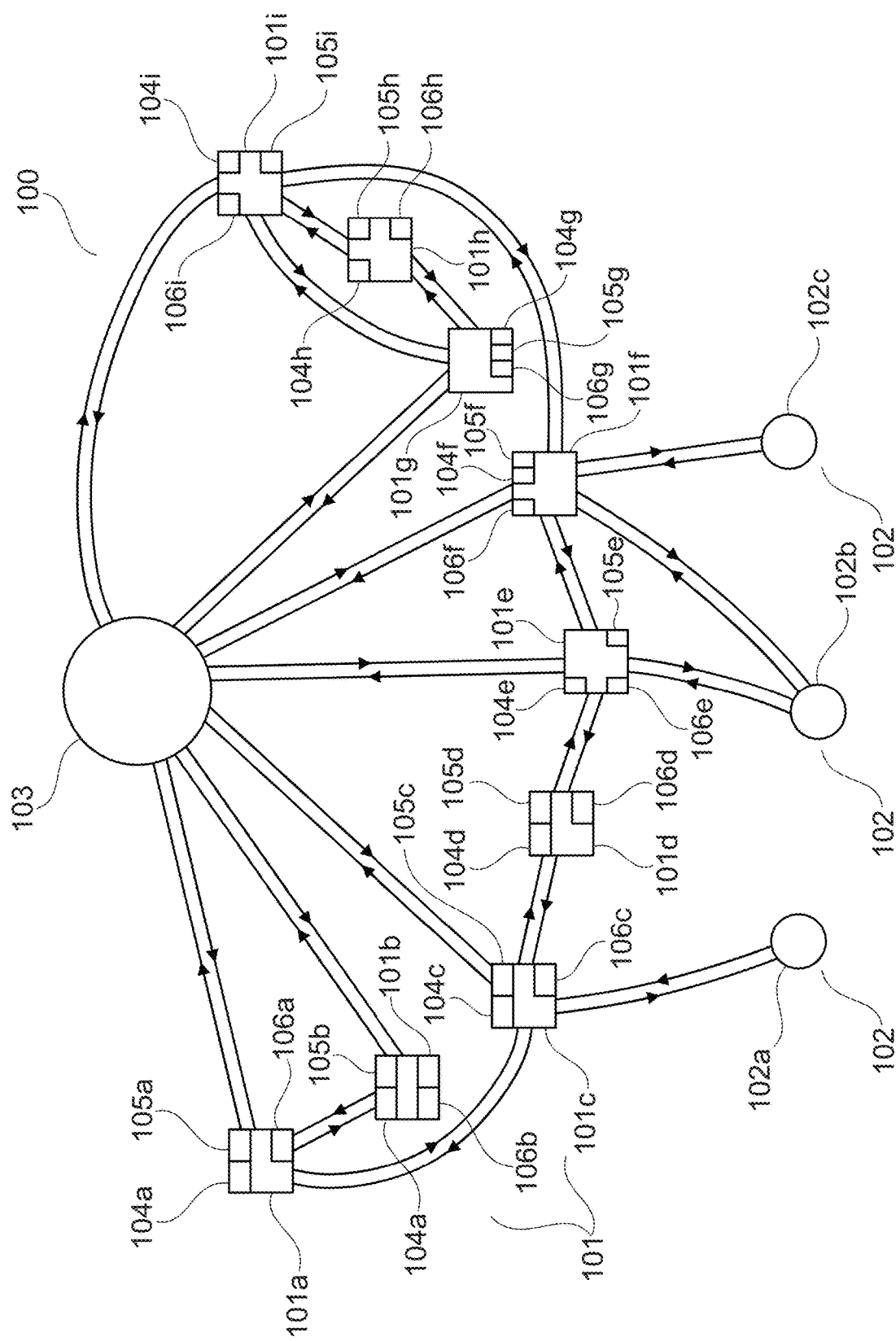
FIG. 1 shows a system according to the technology disclosed which is comprising a master control unit and a plurality of ventilation sub-systems.

FIG. 2 illustrates a system for purifying air according to embodiments of the technology disclosed.

FIG. 3 illustrates a wastewater treatment system communicatively connected to the ventilation system or master control unit of the technology disclosed.

FIG. 4 illustrates a system for purifying air according to embodiments of the technology disclosed.

DETAILED DESCRIPTION

As used herein, the terms "process variable" and "process-related parameter values" refers to at least one of process variables and parameter values for controlling a biological treatment process for biologically breaking down at least one of fat, oil and grease (FOG).

In embodiments, the terms "process variable" and "process-related parameter values" used in this disclosure may include process variables, process schemes and process parameters for controlling the adding/dosing/spraying of a composition of microorganisms for improving the biological process for breaking down FOG, e.g. process variables, process schemes and process parameters for controlling the added/dosed/sprayed amounts of microorganisms per time unit.

In embodiments, the terms "process variable" and "process-related parameter values" used in this disclosure may include process variables, process schemes and process parameters for controlling the adding/injecting/spraying of an oxygen-containing gas, for example air, for stimulating the growth of microorganisms and thereby improve the biological process for breaking down FOG, e.g. process variables, process schemes and process parameters for controlling the added/injected/sprayed amounts of oxygen-containing gas per time unit.

In embodiments, the terms "process variable" and "process-related parameter values" used in this disclosure may include process variables, process schemes and process parameters for controlling the heat actively added to a biological treatment zone/area of a system for stimulating the growth of microorganisms and thereby improve the biological treatment process for biologically breaking down fat, oil and/or grease (FOG), e.g. process variables, process schemes and process parameters for controlling the heat added per time unit, e.g. using a separate heater unit/system.

In embodiments, the terms "process variable" and "process-related parameter values" used in this disclosure may include process variables, process schemes and process parameters for controlling the cooling down of a biological treatment zone/area of a system to thereby improve the overall biological treatment process for biologically breaking down fat, oil and/or grease (FOG).

In aspects, the system of the technology disclosed will detect any change in the bioprocess to the better or worse in terms of biodegradation of FOG and would therefore trigger a sample and analysis to determine if the change in microculture has occurred that could be used as either a starting culture in any other biosystem in other sites or as a sample for further product development of the initiative induced microculture.

In aspects, it is an object of the technology disclosed to provide methods and systems for determining or detecting whether a change in a biological process has occurred at least partly based on obtained sensor data related to the biological process, where the obtained sensor data may explicitly indicate a change in the biological process. An indication of a change in the biological process, which is at least partly based on the obtained sensor data, may trigger the collecting of a sample and, optionally, a further analysis of the collected sample. The analysis of the sample may determine if a change in the microculture has occurred In aspects, it is an object of the technology disclosed to provide methods for detecting a change in a biological process at least partly based on obtained sensor data related to the biological process, where the obtained sensor data may explicitly indicate a change in the biological process. A change in the biological process which may be determined at least based on the obtained, e.g. collected or received sensor data, may trigger the collecting of a sample and, optionally, and may further trigger the performing of an analysis of the collected sample.

In certain aspects, it is an object of the technology disclosed to perform an analysis of the sample may determine if a change in the microculture has occurred, e.g. that a spontaneous mutation has occurred, e.g. of the microculture initially added to biological treatment process, and/or that a change in the composition of microorganisms has occurred, e.g. a change in the ratio of different microorganisms in the composition of microorganisms. A microculture in the collected sample could be used as either a starting culture in any other biological treatment system, e.g. at other sites, or as a sample for further product development of a microculture in the collected sample. The system, or a master control unit communicatively coupled to the system, of the technology disclosed may determine, at least partly based on obtained sensor data, that a change in the biological process has occurred. The collected sample containing the microculture, or culture of microorganisms, may then be collected from a biological treatment zone of the system and the collected sample may be suitable for biologically treating fat, oil and/or grease (FOG), e.g. suitable for breaking down fat, oil and/or grease and/or suitable for partial biodegradation of fat, oil and/or grease.

In embodiments, the technology disclosed relates to methods, a system and apparatuses comprising control units for sharing data and/or information between sub-systems and/or a master control unit, for the purpose of controlling a treatment process in a sub-system, where the sub-system is using microorganisms for purification of air streams containing high amounts of particles of fat, oil and/or grease.

In embodiments, the technology disclosed further relates to methods, systems comprising at least one of sensor data, soft sensor data, image data, process variables, IoT (Internet of Things), machine-learning algorithms, deep learning algorithms and artificial intelligence for determining whether and when to collect a sample containing a culture or microorganisms and/or for changing a treatment process. Historic data and/or environmental variables may also be used as input data for determining whether and when to collect a sample containing a culture or microorganisms, or when not to collect a sample.

In embodiments, the technology disclosed relates to methods, systems comprising at least one of sensor data, soft sensor data, image data, process variables, IoT (Internet of Things), machine-learning algorithms, deep learning algorithms and artificial intelligence for changing a treatment process which involves adding a composition/culture of microorganism and/or changing at least one process variable of at least one process for the biological treatment of fat, oil and grease accumulated in ventilation ducts and the biological treatment of air streams in a process of purifying air, e.g. in a ventilation system.

In other aspects, the objects of the technology disclosed include purifying air with the use of microorganisms. In certain aspects, it is an object of the technology disclosed to provide a method, a system and a plurality of ventilation systems, where each ventilation system comprises at least one ventilation duct and a control unit communicatively coupled to the control units of other ventilation systems and which is configured to share data and/or information with the control units of other ventilation systems. The data and/or information that is shared between the control units of the plurality of ventilation systems may data and/or information related to at least one of sensor data, images and process variables.

In embodiments, the technology disclosed relates to methods for indicating, based on at least one of sensor data, image data and process variables or calculations from received data, that a composition/culture of microorganisms involved in a process for purification of air is performing well and that a sample containing the composition/culture of microorganisms should be collected or extracted from the treatment process to be used in another ventilation system.

In embodiments, the technology disclosed relates to a method, a system and an apparatus for sharing data and/or information between systems, sub-systems and/or a master control unit for the purpose of controlling a treatment process in a system or sub-system, where the system or sub-system is using microorganisms for the biological treatment of accumulated fat, oil and grease (FOG) on the inner surfaces of the ventilation duct(s) of a system for purifying air. The technology disclosed further relates to methods, systems comprising at least one of sensor data, image data, process variables, IoT (Internet of Things), machine/deep learning and artificial intelligence for changing a biological treatment process based on obtained sensor data, e.g. automatically changing a biological treatment process based on sensor data. The technology disclosed may involve adding a composition of microorganism and/or changing at least one process variable of at least one process for the treatment of accumulated fat, oil and grease (FOG) in a ventilation system.

According to certain aspects, the objects of the technology disclosed include providing a method, a master control unit and a plurality of ventilation systems for biologically breaking down accumulated fat, oil and/or grease (FOG), where each biological treatment system comprises a control unit communicatively coupled to the control units of other systems and which is configured to share data and/or information with the master control units. The data and/or information that is shared with the master control unit may at least partly be based on at least one of sensor data, such as image data or audio data, and/or may be process variables such as process-related parameter values. In embodiments, at least one of the plurality of biological treatment systems is a system for purifying air by adding/dosing/spraying a certain composition of microorganisms for improving the biological process for breaking down FOG.

In embodiments, a plurality of the plurality of sub-systems in the form of ventilation systems are communicatively coupled to and configured to at least one of receive and exchange data or information with at least one other device or system, and wherein said other device or system include at least one of a booking system, a weather report system and a dishwasher.

In embodiments, a master control unit communicatively coupled to a plurality of sub-systems in the form of ventilation systems are communicatively coupled to and configured to at least one of receive and exchange data or information directly from at least one other device or system, where the at least one other device or system include at least one of a booking system, a weather report system and a dishwasher.

In other aspects, the system comprises a plurality of ventilation systems including a first and a second ventilation system, and wherein said master control unit is configured to receive, from at least one of said plurality of ventilation systems, data or information related to the ventilation process for at least one of said plurality of ventilation systems, said data is indicating that it is time to collect a sample of liquid containing microorganisms used by said first ventilation system for spraying a liquid mist containing those microorganisms. The system may then be configured to add the collected sample containing microorganisms to the second ventilation system for spraying liquid mists containing those microorganisms.

In embodiments, the received data on which the determining of whether it is time to extract a liquid sample of microbe cultures of microorganisms is based on at least one of process variables and data related to the biological behavior of at least one microbe culture of microorganisms used for biologically breaking down accumulated fat, oil and grease.

In embodiments, the received data on which the decision whether it is time to extract a liquid sample of microbe cultures of microorganisms is based on at least one of process variables for controlling said biological treatment process for breaking down accumulated fat, oil and grease and data related to the biological behavior of said microbe cultures of microorganisms to be extracted.

In embodiments, the decision by the master control unit whether it is time to extract a liquid sample of microbe cultures of microorganisms used by the spray nozzles is at least partly based on data processing operation and/or calculations performed by said master control unit.

In embodiments, these calculations are based on data received from the first ventilation system, and wherein said received data is at least one of process variables for said biological treatment process and data related to the biological behavior of said microbe cultures of microorganisms.

In embodiments, the received data on which the decision by the master control unit whether it is time to extract a liquid sample of microbe cultures of microorganisms used by the at least one spray nozzle for spraying a liquid mist is based on at least one of measured sensor data and soft sensor data received from at least one of said plurality of ventilation systems.

In embodiments, the received data on which the decision by the master control unit whether it is time to extract a liquid sample of microbe cultures of microorganisms used by the at least one spray nozzle for spraying a liquid mist is based on at least one of measured sensor data and soft sensor data received from a plurality of ventilation systems among a plurality of ventilation systems.

In embodiments, the received data on which the decision by said master control unit whether it is time to extract a liquid sample of microbe cultures of microorganisms used by the at least one spray nozzle for spraying a liquid mist is at least partly based on sensor data indicating the biological behavior of said microbe culture of microorganisms to be extracted. In certain embodiments, the decision by the master control unit whether it is time to extract a liquid sample of microbe cultures of microorganisms may in addition also at least partly based on data or information exchanged with and/or received from at least one other device or system, wherein the at least one other device or system may include at least one of the booking system for at least one restaurant, a weather report system, a control system/unit for monitoring air pollution in air or air streams, a control system/unit for monitoring/detecting the outflow of wastewater from at least one kitchen and/or restaurant, and/or a dishwasher control unit.

FIG. 1 shows a system (100) comprising a master control unit (103) and a plurality of sub-systems (101). The plurality of sub-systems (101) in FIG. 1 are communicatively coupled to and configured to at least one of receive, share and exchange data or information with other sub-systems (101) as well as other devices (102). The other devices (102) include a booking system (102a), a weather report system (102b) and a dishwasher (102c). The data received by the master control unit ( ) include sensor data measured by sensors (104a, 104b, 104c, 104d, 104e, 104f, 104g, 104h, 104i) comprised in and associated with the plurality of sub-systems (101a, 101b, 101c, 101d, 101e, 101f, 101g, 101h, 101i) and/or image data or at least one captured image taken by a camera (105a, 105b, 105c, 105d, 105e, 105f, 105g, 105h, 105i) of a sub-system. The master control unit in FIG. 1 (103) is configured to send control data for changing process parameters for a second treatment process of a second sub-system (101b) at least partly based on received process variables and/or sensor data measured by a sensor of a first treatment process of a first sub-system (101a). The sub-systems (101) in FIG. 1 may include at least a plurality of wastewater treatment systems (101a, 101b), a plurality of fraction collectors (101c, 101d), a plurality of waste management systems (101e, 101f), a treatment plant (101g), in addition to the plurality of ventilation systems (101h, 101i) for purifying air.

The plurality of sub-systems, or treatment systems (101a, 101b, 101c, 101d, 101e, 101f, 101g, 101h, 101i) in FIG. 1 each comprises a control unit (106a, 106b, 106c, 106d, 106e, 106f, 106g, 106h, 106i) communicatively coupled to both the master control unit (103) and the control units of other ventilation systems for biologically breaking down accumulated fat, oil and grease. The master control unit 103 and the control units (106a, 106b, 106c, 106d, 106e, 106f, 106g, 106h, 106i) in FIG. 1 comprise a processor for processing data and which is configured to perform calculations. The control units of the ventilation systems are configured to send, receive and/or share data and/or information related their own treatment process, e.g. measured sensor data, captured images or parameter values for process variables, with the control units of at least one other sub-system. The plurality of sub-systems (101) of the system (100) include a plurality of ventilation systems (101h, 101i) for purifying air. In addition, the plurality of sub-systems are communicatively coupled to and configured to at least one of receive and exchange data or information with at least one other device or system (102). The other device or system in FIG. 1 include a booking system (102a), a weather report system (102b) and a dishwasher (102c).

Figure 2:
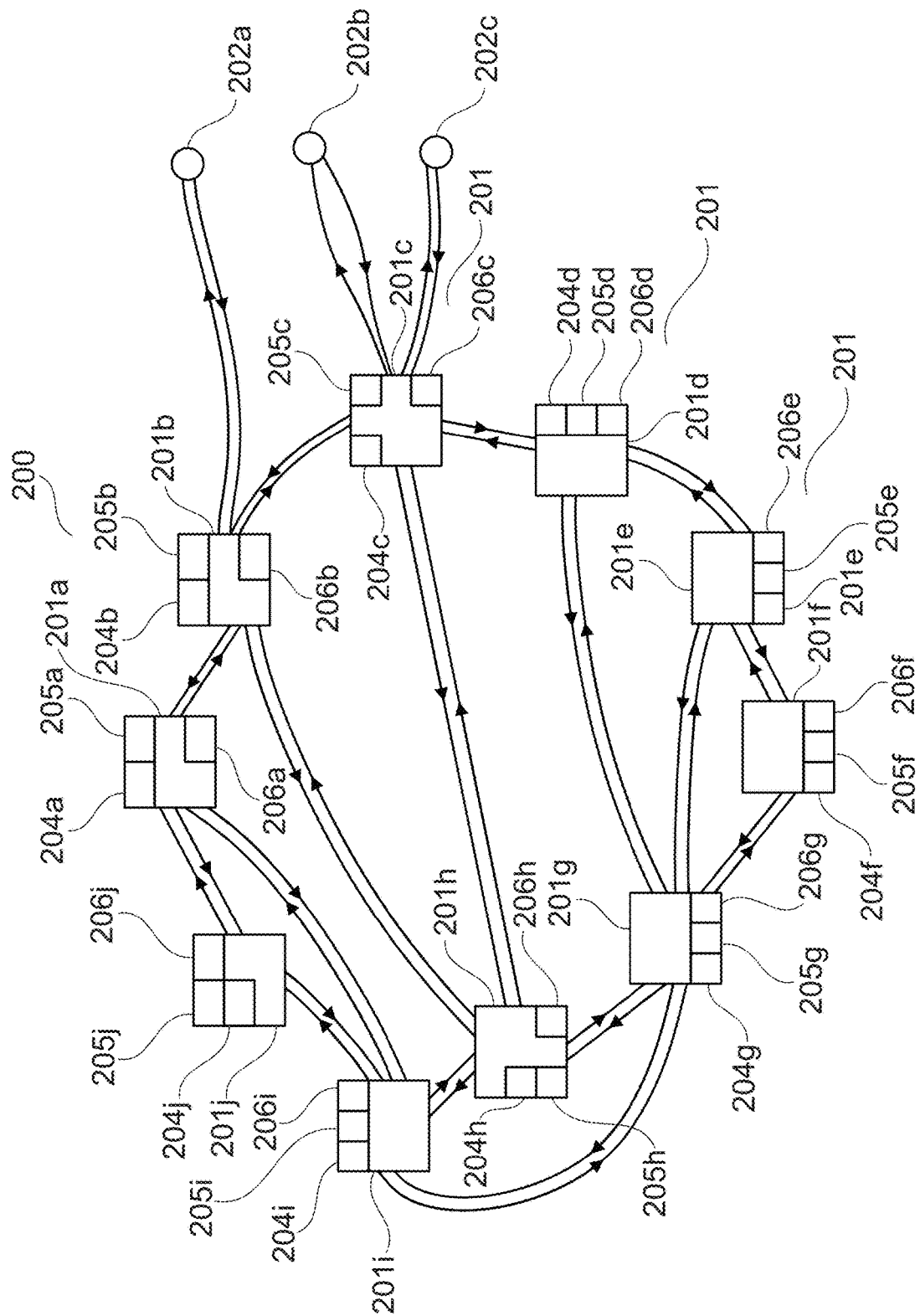

FIG. 2 shows a system (200) comprising a plurality of sub-systems (201), where each of the plurality of sub-systems (201a, 201b, 201c, 201d, 201e, 201f, 201g, 201h, 101i, 201j) comprises a control unit (206a, 206b, 206c, 206d, 206e, 206f, 206g, 206h, 206i, 206j) communicatively coupled to the control units of other sub-systems including a plurality of ventilation systems. Each of the sub-systems in FIG. 2 has a sensor (204a, 204b, 204c, 204d, 204e, 204f, 204g, 204h, 204i, 204j) for measuring sensor data and a camera (205a, 205b, 205c, 205d, 205e, 205f, 205g, 205h, 205i, 205j) for taking images. The control unit (206a) of a first sub-system (201a) is configured to share data and/or information with the control units of other sub-systems. Data received by the control unit (206b) of a second sub-system (202b) include at least one of process variables for controlling the frequency and/or time instants for activating the at least one spray nozzle and/or the amount of liquid mist or microorganisms per unit of time sprayed, and/or image data or at least one captured image taken by a camera (205a) of the first sub-system (202a), and/or sensor data measured by a sensor (204a) associated with the first sub-system (202a). The control unit (206a) of the first sub-system (201a) is configured to send control data for changing process parameters for controlling and/or changing the frequency and/or time instants for activating the at least one spray nozzle and/or the amount of liquid mist or microorganisms per unit of time sprayed for the second sub-system (201b) at least partly based on the received sensor data. The data and/or information that is shared between the control units (206a, 206b, 206c, 206d, 206e, 206f, 206g, 206h, 206i, 206j) of the plurality of sub-systems (201a, 201b, 201c, 201d, 201e, 201f, 201g, 201h, 201i, 201j) is data and/or information related to at least one of sensor data, images and process variables. The sub-systems (201) in FIG. 2 include a plurality of ventilation systems (201i, 201j) for purifying air. The control units of the plurality of sub-systems in FIG. 2 are communicatively coupled to and configured to at least one of receive and exchange data or information with other devices. These other devices in FIG. 2 include a booking system, a weather report system and a dishwasher.

The plurality of sub-systems, or treatment systems, in FIG. 2 comprise a control unit communicatively coupled to the control units of other ventilation systems for biologically breaking down accumulated fat, oil and grease. The control units of the sub-systems in FIG. 1 comprise a processor for processing data and which is configured to perform calculations. The control units of the treatment systems are configured to send, receive and/or share data and/or information related their own treatment process, e.g. measured sensor data, captured images or parameter values for process variables, with the control units of at least one other sub-system. The plurality of sub-systems of the system may include a plurality of ventilation systems for biologically breaking down fat, oil and grease present on the inner surfaces of the ventilation ducts/tubes. In addition, the plurality of sub-systems are communicatively coupled to and configured to at least one of receive and exchange data or information with at least one other device or system. The other device or system in FIG. 1 includes a booking system, a weather report system and a dishwasher.

Figure 3:
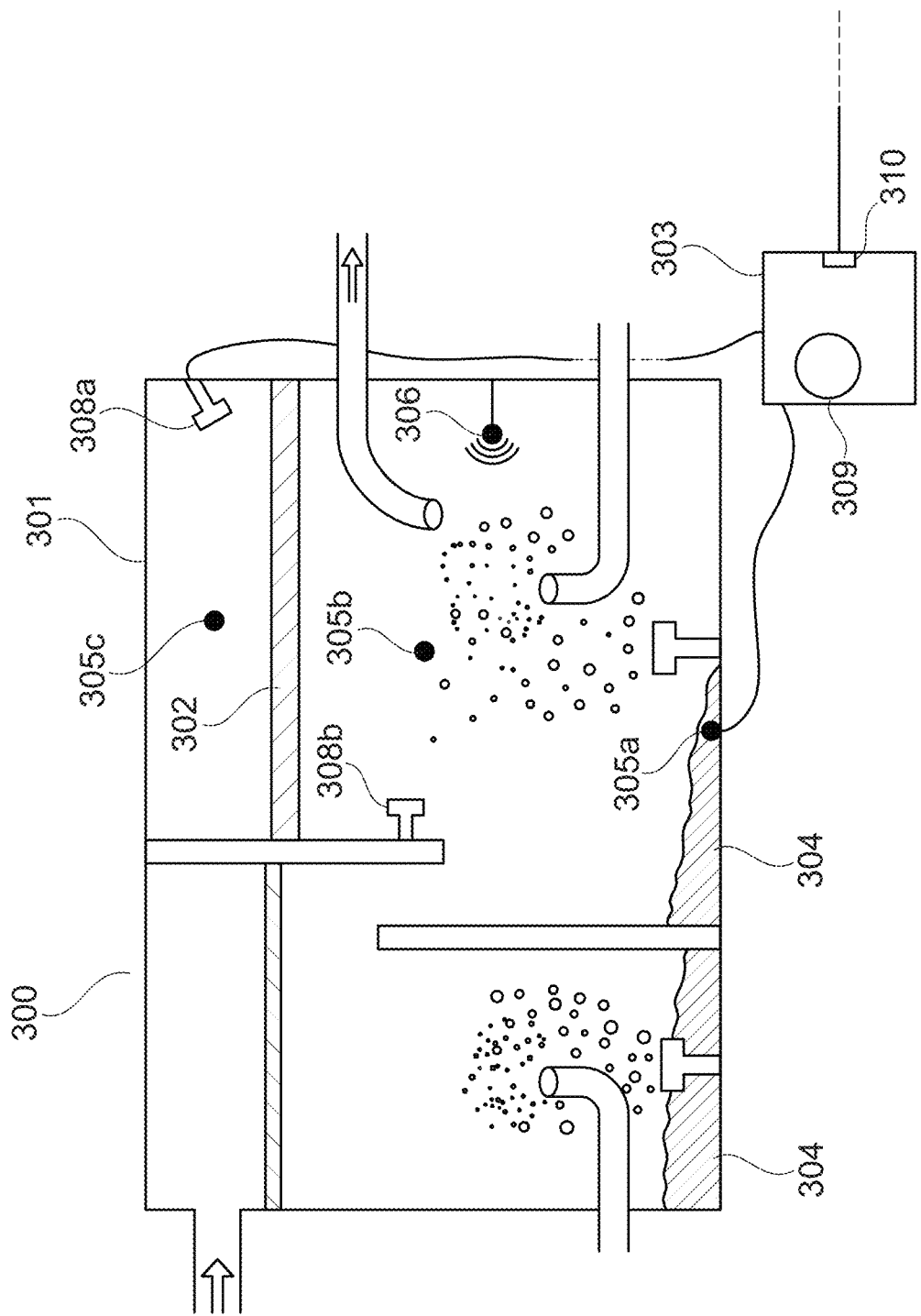

FIG. 3 shows an example embodiment of a wastewater treatment system (300) comprising three microphones (305a, 305b, 305c). At least one of the three microphones (305a, 305b, 305c) is used for determining, detecting and/or measuring the thickness of the fat/FOG cake (302) in the wastewater treatment tank (301), and may also be used for determining the amounts of foam. In this embodiment, a data processing unit (307) is used for processing the data obtained by at least one of the microphones (305a, 305b, 305c). Data, which is at least partly based on the measured/detected thickness of the fat/FOG cake (302) and/or the obtained audio data, or audio characteristics, is sent from a control system (303) of the wastewater treatment system (300) to at least one of a remotely located master control unit (not shown) and/or a control system of another second wastewater treatment system (not shown) that is remotely located from the wastewater treatment system (300). The control system (303) comprises a transmitter (310) for transmitting the data to the remotely located master control unit and/or the control system of the other second wastewater treatment. The wastewater treatment system (300) illustrated in FIG. 3 may communicatively connected to a remotely located master control unit (103) or a ventilation system (400) according to different embodiments of the technology disclosed and the control system/unit and the data processing unit (307) of the wastewater system (300) may be communicatively connected to the data processing unit (410) and/or the control system (408) of the system for purifying air (400), or ventilation system, illustrated in FIG. 4.

Figure 4:
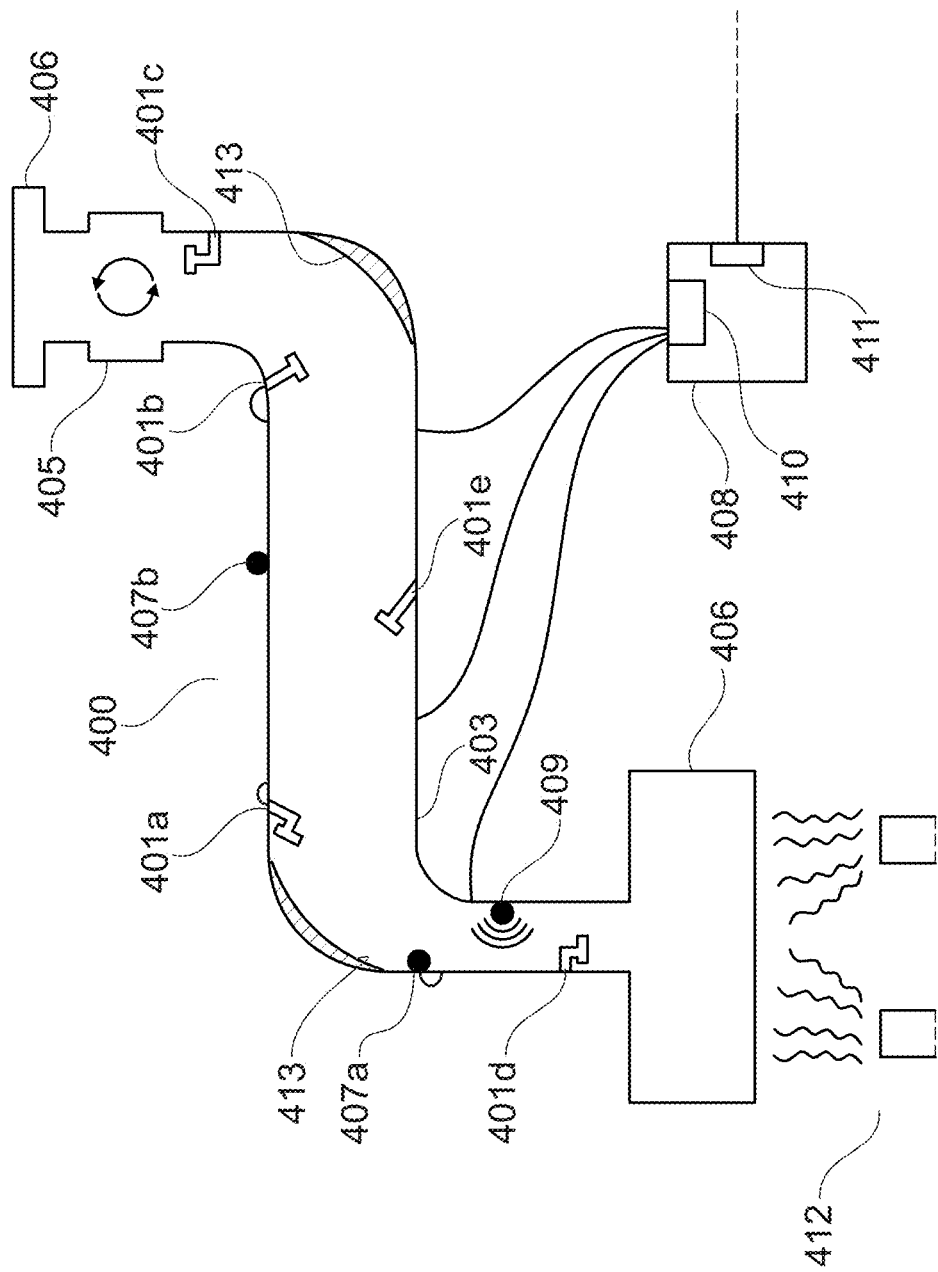

FIG. 4 illustrates an example embodiment of a system for purifying air (400) received from a kitchen area (412), where the system for purifying air comprises a ventilation duct (403), a plurality of cameras (401a, 401b, 401c, 401d, 401e), a control system (408) and nozzles (402a, 402b, 402c, 402d) for dosing, i.e. spraying, a liquid culture of microorganisms and/or a water vapor composition containing a culture of microorganisms, for improving the biological process for breaking down FOG. A data processing unit (410) of the control system (408) is used for processing the data obtained by at least one of the cameras (401a, 401b, 401c, 401d, 401e). Some of the cameras (401a, 401b) are located to be used of determining the amount of accumulated fat, oil and/or grease in the ventilation duct (403), e.g. the thickness of the layer of accumulated FOG. These cameras (401a, 401b) are located inside the ventilation duct (403) and are directed at the inside surface areas of the bends (413) of the duct (403) where it is more likely that fat, oil and grease (FOG) is accumulated. The nozzles (402a, 402b, 402c, 402d) for dosing/spraying the liquid culture of microorganisms and/or the water vapor composition are strategically located inside the ventilation duct (403) and are configured and directed to be dosing/spraying surface areas (404) on the inside surface area, where it is more likely that FOG is accumulated, with a culture/composition of microorganisms. Some of the nozzles (402c, 402d) for dosing/spraying the culture/composition of microorganisms for breaking down fat, oil and/or grease are located and directed at a heat exchanger (405) and a filter (406), respectively. Heat exchangers (405) and filters (406) tend to accumulate more fat, oil and grease than other parts or surface areas of the system. One of the cameras (401c) is directed at the heat exchanger (405) to detect accumulated fat, oil and/or grease in the heat exchanger (405). One of the cameras is directed at one of the filters (406) to detect accumulated fat, oil and/or grease in the filter (406). One of the cameras (401e) is an infrared camera, or detector, for detecting heat changes in the system for purifying air (400).

In addition to the cameras, microphones and audio sensors (401a, 401b401c, 401d, 401e, 407a, 407b, 409) illustrated in FIG. 4, the ventilation system (400) may comprise at least one of a temperature sensor, a pressure sensor, an acoustic wave sensor, an optical sensor, an ultrasonic sensor, a radar sensor and an inductive sensor. These cameras, microphones and other sensors is configured to obtain sensor data adapted to be used for estimating, by the control system (408), at least one of the efficiency of the biological treatment process and the amount of accumulated fat, oil and grease on the at least one portion of the inner surfaces of the ventilation system. The control system (408) in FIG. 4 may be further configured to change the frequency and/or time instants for activating the spray nozzles (402a, 402b, 402c, 402d) for spraying a liquid mist containing microorganisms and/or the amount of liquid mist or microorganisms per unit of time sprayed onto the at least one portion of the inner surface based on at least one of obtained sensor data, image data and/or audio data and an amount of accumulated fat, oil and grease estimated by the control system (408) or a remotely located processor.

The control system (408) in FIG. 4 further comprises a transmitter (411) for transmitting at least one of the image data obtained by at least one of the cameras (401a, 401b, 401c, 401d, 401e) to a remotely located master control unit (not shown) and/or the control system of another system for purifying air that is remotely located from the system for purifying air (400). Data or information which is at least partly based on the image data, e.g. video data, obtained by at least one of the cameras (401a, 401b, 401c, 401d, 401e) may also be sent by the transmitter of the control system/unit of another second system for purifying air (not shown), or to/via a remotely located master control unit (not shown), with the purpose of changing a process variable and/or process-related parameter values for controlling the biological treatment process of the other second system for purifying air.

The system for purifying air (400) illustrated in FIG. 4 also comprises microphones (407a, 407b) for detecting sound/audio data located inside the ventilation duct (403). One of the microphones (407a) is located inside the ventilation duct (403) and one of the microphones (407b) is located on the outside of the ventilation duct (403). The ventilation sound is affected by layers of fat, oil and grease (FOG) accumulated on the inside surface of the ventilation tube, in the heat exchanger (405) and in the filters (406). Data or information, e.g. analyzed and/or processed data which is at least partly based on measured/detected amounts of FOG in the heat exchanger (405) and filters (406) and/or the thickness of the layer of FOG in the ventilation duct (403) is used by a control system (408) of the system for purifying air (400), or a remotely located master control unit (not shown), to control, for example, the amount of microorganisms dosed/sprayed by at least one of the nozzles (402a, 402b, 402c, 402d) per unit of time, the amount of water vapor sprayed by at least one of the nozzles per unit of time, but may also be used as input data for determining, by the control system (408) or a remotely located master control unit (not shown), whether to change a process scheme for the biological treatment process and/or increase or decrease the process time for the biological treatment process.

The control system (408) in FIG. 4 further comprises a transmitter (411) for transmitting at least one of the obtained audio data and/or analyzed or processed audio data to a remotely located master control unit (not shown) and/or the control system of another system for purifying air that is remotely located from the system for purifying air (400). Data or information which is at least partly based on the obtained audio/sound data, or audio characteristics, may also be sent by the transmitter of the control system/unit of another second system for purifying air (not shown), or to/via a remotely located master control unit (not shown), with the purpose of changing a process variable and/or process-related parameter values for controlling the biological treatment process of the other second system for purifying air.

A sound source (409) generates a sound impulse travelling through the air ducts and changes to the sound impulse is detected by the microphone located inside the duct (401d) and analyzed by an audio data processing unit (410). Analyzed audio data reflecting a change to the generated sound impulse is sent to the control system (408) of the system for purifying air (400), and/or to a remotely located master control unit (not shown), e.g. via the control system (408). The control system (408), or the master control unit, send control/instruction data at least partly based on the received sensor data (which in turn is at least partly based on detected changes to the generated sound impulse), is generated and transmitted for changing a biological treatment process in the system for purifying air (400), or for changing the process for breaking down FOG in another system for purifying air (not shown).

The control system (408) of the ventilation system (400) in FIG. 4 may be configured to change, e.g. automatically change, at least one process variable, process scheme and/or process parameter used for controlling the frequency and/or time instants for activating the spray nozzles (402a, 402b, 402c, 402d) and/or the amount of liquid mist or microorganisms per unit of time sprayed onto at least one portion of the inner surface based on at least one of the obtained sensor data, image data and/or audio data and an estimated amount of accumulated fat, oil and grease.

According to the different embodiments of the technology disclosed, the microorganisms may consist of bacteria, fungi, archaea, and protists. Microorganisms can be a single species or a mixture of consortia. Microorganisms can be natural or bioengineered and genetic-altered organisms.

Acoustic wave sensors are generally classified based on the propagation mode of the acoustic wave. Some common wave types and sensors are: Bulk acoustic wave (BAW): wave travels through the piezoelectric substrate, e.g. Thickness shear mode resonator (TSM) or Shear-horizontal acoustic plate mode sensor (SH-APM), and Surface acoustic wave (SAW): wave travels on the surface of the substrate, e.g. Rayleigh surface waves sensor (generally known as a SAW sensor) or Shear-horizontal surface acoustic wave sensor (SH-SAW), also known as the surface transverse wave sensor (STW). SAW devices are particular among this group since surface acoustic waves include a vertical shear component, which greatly affects the velocity and amplitude of the wave along the delay line. This results in higher sensitivity among SAW devices than shear-horizontal wave sensors.

The basic operation of an acoustic wave sensor includes the following steps:

1. Sensor transduces an electric signal into an acoustic wave;
2. The acoustic wave is propagated, at which time it is affected by its environment;
3. Sensor transduces the acoustic wave back into an electric signal; and
4. The signals are compared to determine what changes the wave underwent during its propagation. These changes can then be used to determine the properties of the environment through which the acoustic wave propagated.

Acoustic wave sensors are very versatile in that they may be used alone or as part of a filtered sensor to measure many phenomena, including mass, temperature, pressure, stress, strain, torque, acceleration, friction, humidity, UV radiation, magnetic fields, and viscosity.

In embodiments, the technology disclosed relates to a method that includes detecting and identifying bacteria or microorganisms in a liquid medium. In certain embodiments, the bacteria or microorganisms being of the kind which produce signaling molecules in intercellular space, includes positioning a biosensor in the liquid medium. The biosensor may then have a biolayer matched to specific signaling molecules to be detected, whereby the biolayer is reactive thereto in a manner which varies operation of the sensor. Such variation of the operation of the biosensor is then detected to thereby determine the presence and purpose of the bacteria or microorganisms in the liquid medium. These embodiments may be well suited for monitoring certain environments which require the detection of various species of bacteria, including but not limited to airborne microorganisms.

Signalling molecules, characterized as autoinducers, diffuse more readily within the surrounding environment compared to the actual bacterium. The present invention is well suited for SAW (surface acoustic wave) geometries which are typically in the sub-micron range and can also function as RFID sensors which can be interrogated by a wireless system. SAW detectors can be small, simple in nature and provide microbial differentiation detection results in typically 10 seconds or less.

In certain embodiments, the present invention also provides acoustic wave-based sensors coated with specific bioreceptor molecules which can detect small signalling molecules from an originating species in real-time and quantify the acoustic wave sensor data due to the linear relationship between the mass of the signalling molecule and the velocity of the acoustic wave to thereby identify both the presence and the purpose of the originating species. Such biosensors can provide a medium for detecting harmful biological agents without coming into direct contact with the bacteria themselves. In addition, acoustic wave biosensor techniques permit quantification through the direct relationship between the concentrations of small signalling molecules in intercellular space to the relative amount of signalling source present. These embodiments of the technology disclosed are well-suited to be used for real time detection.

Soft sensor, or virtual sensor, is a common name for software where several measurements are processed together. Commonly soft sensors are based on control theory and also receive the name of state observer. There may be dozens or even hundreds of measurements. The interaction of the signals can be used for calculating new quantities that need not be measured. Soft sensors are especially useful in data fusion, where measurements of different characteristics and dynamics are combined. It can be used for fault diagnosis as well as control applications. Well-known software algorithms that can be seen as soft sensors include e.g. Kalman filters. More recent implementations of soft sensors use neural networks or fuzzy computing.

In embodiments, the ventilation system may comprises at least one of an ultrasonic level sensor or a radar level sensor for determining the thickness of the accumulated fat, oil and grease present on the inner surfaces of the ventilation systems.

In embodiments, the control system of a first ventilation system may be configured to continuously and/or periodically send sensor data from the at least one of an ultrasonic level sensor or a radar level sensor to a remotely-located control system of a second ventilation system and/or a remotely-located master control unit.

In some embodiments, the ventilation ducts of the ventilation system configured for biologically breaking down fat, oil and grease comprises a camera for determining the thickness of the accumulated fat, oil and grease present on the inner surfaces of the ventilation systems.

In embodiments, the control system of a first ventilation system may be configured to continuously and/or periodically send image data collected by the camera for determining the thickness of accumulated fat, oil and grease to a remotely-located control system of a second ventilation system and/or to a remotely-located master control unit.

The invention claimed is:

1. A ventilation system comprising ventilation ducts, a control system and a plurality of spray nozzles, wherein each of said plurality of spray nozzles is configured to spray a liquid mist onto at least one portion of an inner surface of the ventilation system, and wherein said liquid mist is containing a culture of microorganisms adapted for biologically treating fat, oil and grease present on different portions of the inner surface of the ventilation system, thereby providing for partial biodegradation of the fat, oil and grease present on the different portions of the inner surfaces of the ventilation system, wherein the ventilation system comprises at least one camera and/or microphone configured to obtain image and/or audio data for estimating, by the control system, the amount of accumulated fat, oil and grease on the different portions of the inner surface, and wherein said ventilation system comprises a plurality of spray nozzles directed toward different portions of the inner surface of the ventilation system, and wherein said control system is further configured to control the plurality of spray nozzles so that different amounts of liquid mist is sprayed onto the different portions of the inner surfaces based on estimated, by the control system, different amounts of accumulated fat, oil and grease present on the different inner surfaces.

2. The ventilation system according to claim 1, wherein the ventilation system comprises at least one sensor configured to obtain sensor data adapted to be used for estimating the efficiency of the biological treatment process.

3. The ventilation system according to claim 2, wherein the at least one sensor includes at least one of a temperature sensor, a pressure sensor, an acoustic wave sensor, an optical sensor, an ultrasonic sensor, a radar sensor and an inductive sensor configured to obtain sensor data adapted to be used for estimating, by the control system, at least one of the efficiency of the biological treatment process and the amount of accumulated fat, oil and grease on the different portions of the inner surfaces of the ventilation system.

4. The ventilation system according to claim 3, wherein the control system is configured to change the frequency and/or time instants for activating the plurality of spray nozzles and/or the amount of liquid mist or microorganisms per unit of time sprayed onto the different portions of the inner surface based on at least one of obtained sensor data, image data and/or audio data and an estimated amount of accumulated fat, oil and grease.

5. The ventilation system according to claim 1, wherein said control system is further configured to change at least one process variable, process scheme and/or process parameter used for controlling the frequency and/or time instants for activating the plurality of spray nozzles and/or the amount of liquid mist or microorganisms per unit of time sprayed onto the different portions of the inner surface based on at least one of the obtained sensor data, image data and/or audio data and an estimated amount of accumulated fat, oil and grease.

6. The ventilation system according to claim 1, wherein said ventilation system comprises a heat exchanger and at least one temperature sensor, infrared camera and/or detector for obtaining sensor data for determining the difference in air temperature before and after the heat exchanger.

7. The ventilation system according to claim 6, wherein said control system is further configured to change the frequency and/or time instants for activating the plurality of spray nozzles and/or the amount of liquid mist or microorganisms per unit of time sprayed onto the different portions of the inner surfaces of the ventilation system based on the determined difference in air temperature before and after the heat exchanger.

8. The ventilation system according to claim 1, wherein said control system is further configured to receive control data or instruction data from another ventilation system and/or a master control unit, wherein said control system is further configured to, in response to said received control data or instruction data, change the frequency and/or time instants for activating the plurality of spray nozzles and/or the amount of liquid mist or microorganisms per unit of time sprayed onto the different portions of the inner surfaces of the ventilation system.

9. The ventilation system according to claim 1, wherein said control system is further configured to receive control data or instruction data from a wastewater treatment system and/or a master control unit, wherein said control system is further configured to, in response to said received control data or instruction data, change at least one process variable, process scheme and/or process parameter for controlling the frequency and/or time instants for activating the plurality of spray nozzles and/or the amount of liquid mist or microorganisms per unit of time sprayed onto the different portions of the inner surfaces of the ventilation system.

10. The ventilation system according to claim 1, wherein at least one of the plurality of spray nozzles is adapted to be used for flushing off, with a flushing liquid, hydrolyzed fat present on the inner surfaces of the ventilation ducts, and wherein the control system is further configured to change the frequency and/or time instants for activating the plurality of spray nozzles and/or the amount of flushing liquid per unit of time sprayed onto the different portions of the inner surface based on at least one of obtained sensor data, image data and/or audio data and an estimated amount of accumulated fat, oil and grease.

11. The ventilation system according to claim 1, wherein the control system is configured to control and optimize the frequency and/or time instants for activating the plurality of spray nozzles and/or the amount of liquid mist or microorganisms per unit of time sprayed onto the at least one portion of the inner surface on both an estimated accumulation of fat, oil and grease and/or the rate of increase per unit of the accumulated fat, oil and grease and a determined or estimated current amount of media comprising microorganisms present on the inner surfaces of the ventilation system.

12. The ventilation system according to claim 11, wherein the control system is configured to estimate the amount of accumulated media comprising microorganisms on the inner surfaces of the ventilation system is based on sensor data obtained by the at least one sensor of the ventilation system.

13. The ventilation system according to claim 11, wherein the amount of accumulated media comprising microorganisms on the inner surfaces of the ventilation system is estimated by a remote processor of a master control unit and/or a backend system based on sensor data obtained by the at least one sensor of the ventilation system.

14. A method in a ventilation system comprising ventilation ducts, a control system, at least one sensor, camera, and/or microphone and/or acoustic wave sensor and a plurality of spray nozzles, said method comprising the steps of:
 a) spraying, by the plurality of spray nozzles, a liquid mist onto different portions of the inner surface of the ventilation system, wherein the plurality of spray nozzles are spraying liquid mist toward mutually different inner portions of the ventilation ducts of the ventilation system, and wherein said liquid mist is containing a culture of microorganisms adapted for biologically treating fat, oil and grease present on the different portions of the inner surface of the ventilation ducts, thereby providing for partial biodegradation of the fat, oil and grease present on the at least one portion of the inner surface;
 b) obtaining, by the at least one sensor, camera, and/or microphone and/or acoustic wave sensor, sensor data, audio data and/or image data;
 c) determining, by the control system, estimated amounts of fat, oil and grease accumulated on different inner surfaces of the ventilation system, wherein said determining is based on said obtained sensor data, audio data and/or image data;
 d) controlling, by the control system, the plurality of spray nozzles so that different amounts of liquid mist are sprayed onto the different portions of the inner surfaces based on the estimated, by the control system, different amounts of accumulated fat, oil and grease present on the different inner surfaces of the ventilation ducts; and
 e) changing, by the control system, the amounts of liquid mist sprayed onto different inner surfaces of the ventilation system based on the determined amounts of accumulated fat, oil and grease.

15. The method according to claim 14, wherein the ventilation system further comprises at least one sensor, camera and/or microphone, said method further comprising:
 a) changing, by the control system, the frequency and/or time instants for activating the plurality of spray nozzles and/or the based on at least one of obtained sensor data, image data and/or audio data and the estimated amounts of accumulated fat, oil and grease.

16. The method according to claim 14, said method further comprising:
 a) determining, by the control system, an estimated rate of increase of the amount of fat, oil and grease accumulated on different inner surfaces of the ventilation system; and
 b) changing, by the control system, the frequency and/or time instants for activating the plurality of spray nozzles and/or the amounts of liquid mist sprayed onto different inner surfaces of the ventilation system based on the determined estimated rate of increase in the amount of accumulated fat, oil and grease.

17. The method according to claim 14, wherein the ventilation system further comprises a heat exchanger and at least one temperature sensor, infrared camera and/or detector for determining the difference in air temperature before and after the heat exchanger, said method further comprising:
 a) obtaining, by the at least one temperature sensor, infrared camera and/or detector, sensor data;
 b) determining, by the control system, the difference in air temperature before and after the heat exchanger; and
 c) changing, by the control system and based on at least one of the obtained sensor data and the determined difference in air temperature, the frequency and/or time instants for activating the plurality of spray nozzles and/or the amount of liquid mist or microorganisms per unit of time sprayed onto the different portions of the inner surface.

18. The method according to claim 14, wherein at least one of the plurality of spray nozzles is adapted to be used for flushing off, with a flushing liquid, hydrolyzed fat present on the different inner surfaces of the ventilation ducts, said method further comprising:
 a) changing, by the control system, the frequency and/or time instants for activating the plurality of spray nozzles and/or the amount of flushing liquid per unit of time sprayed onto the different portions of the inner surface based on at least one of obtained sensor data, image data and/or audio data and estimated amounts of accumulated fat, oil and grease.

19. The method according to claim 14, further comprising:
 a) receiving, by the control system and from another ventilation system and/or a master control unit, control data or instruction data; and
 b) changing, by the control system, the frequency and/or time instants for activating the plurality of spray nozzles and/or the amount of liquid mist or microorganisms per unit of time sprayed onto the different inner surfaces based on the received control data or instruction data.

20. The method according to claim 14, further comprising:
 a) receiving, by the control system and from another ventilation system and/or a master control unit, control data or instruction data; and
 b) changing, by the control system and in response to receiving said control data or instruction data, at least one process variable, process scheme and/or process parameter for controlling the activation of spray nozzles and the biological treatment process.

21. The method according to claim 14, further comprising:
 a) determining, by the control system, the amount of media comprising microorganisms previously used for spraying the liquid mist onto the different inner surfaces of the ventilation system over a certain past time period; and
 b) changing, by the control system, the frequency and/or time instants for activating the plurality of spray nozzles and/or the amounts of liquid mist or microorganisms per unit of time sprayed onto the different portions of the inner surfaces on both an estimated accumulation of fat, oil and grease and/or the rate of increase per unit of the accumulated fat, oil and grease and the determined amounts of media comprising microorganisms previously sprayed onto the different inner surfaces of the ventilation system.

22. The method according to claim 14, further comprising:
 a) estimating, by the control system, the amounts of media comprising microorganisms present on the different inner surfaces of the ventilation system, wherein said estimation is based on the obtained sensor data; and
 b) changing, by the control system, the frequency and/or time instants for activating the plurality of spray nozzles and/or the amount of liquid mist or microorganisms per unit of time sprayed onto the different inner surfaces on both an estimated accumulation of fat, oil and grease and/or the rate of increase per unit of the accumulated fat, oil and grease and a determined or estimated current amount of media comprising microorganisms present on the different inner surfaces of the ventilation system.

\* \* \* \* \*